US010482512B2

(12) United States Patent
Meek et al.

(10) Patent No.: US 10,482,512 B2
(45) Date of Patent: Nov. 19, 2019

(54) SYSTEMS AND METHODS FOR FACILITATING THE RETAIL SHOPPING EXPERIENCE ONLINE

(71) Applicants: Michele Meek, Providence, RI (US); Allan Adam Miller, Palo Alto, CA (US); Geoffry Meek, Providence, RI (US)

(72) Inventors: Michele Meek, Providence, RI (US); Allan Adam Miller, Palo Alto, CA (US); Geoffry Meek, Providence, RI (US)

( * ) Notice: Subject to any disclaimer, the term of this patent is extended or adjusted under 35 U.S.C. 154(b) by 446 days.

(21) Appl. No.: 14/292,810

(22) Filed: May 30, 2014

(65) Prior Publication Data
US 2015/0026156 A1    Jan. 22, 2015

Related U.S. Application Data

(60) Provisional application No. 61/829,917, filed on May 31, 2013.

(51) Int. Cl.
G06F 17/30    (2006.01)
G06Q 30/06    (2012.01)
(Continued)

(52) U.S. Cl.
CPC ......... *G06Q 30/0601* (2013.01); *G06F 16/35* (2019.01); *G06F 16/358* (2019.01); *G06F 16/951* (2019.01)

(58) Field of Classification Search
CPC .......... G06Q 30/0601; G06Q 30/0603; G06Q 30/0643; G06Q 30/02; G06Q 30/06;
(Continued)

(56) References Cited

U.S. PATENT DOCUMENTS 5,918,213 A    6/1999  Bernard et al.
6,026,376 A    2/2000  Kenney
(Continued)

FOREIGN PATENT DOCUMENTS

JP    6099342 B2    3/2017

OTHER PUBLICATIONS

Brown, Matthew, and David G. Lowe, Automatic Panoramic Image Stitching using Invariant Features, International Journal of Computer Vision 74(1), 59-73, 2007, Vancouver, Canada.
(Continued)

Primary Examiner — Sheree N Brown

(57) ABSTRACT

Systems and methods of the present disclosure can facilitate selecting a search result. In some embodiments, the system includes a server. The server can be configured to access a data structure, storing product descriptions describing products in a retail store. The server can be configured to store an image including visual representations of the products. The server can be configured to associate image segments with the product descriptions, the segments including the visual representations. The server can be configured to associate classifications with the product descriptions. The server can be configured to display, responsive to input from a user, the image. The server can be configured to select, responsive to input from the user, the search result from the product descriptions. The server can be configured to order the search result, based on the classifications and the image segments associated with the product descriptions selected by the search result.

14 Claims, 29 Drawing Sheets

(51) Int. Cl.
*G06F 16/951* (2019.01)
*G06F 16/35* (2019.01)

(58) Field of Classification Search
CPC ........... G06Q 30/0613; G06Q 30/0224; G06Q 30/0609; G06Q 30/0623; G06Q 30/0631; G06Q 30/0633; G06Q 30/0641; G06Q 20/202; G06Q 30/0625; G06Q 10/08; G06Q 10/087; G06Q 20/02; G06Q 20/04; G06Q 20/10; G06Q 20/12; G06Q 20/20; G06Q 20/204; G06Q 20/208; G06Q 30/00; G06Q 30/0251; G06Q 30/0617; G06Q 30/0621; G06Q 30/0639; G06Q 40/04
USPC .......................................... 705/3, 5; 707/722
See application file for complete search history.

(56) References Cited

U.S. PATENT DOCUMENTS

| | | |
|---|---|---|
| 6,499,052 B1 | 12/2002 | Hoang et al. |
| 6,567,103 B1 | 5/2003 | Chaudhry |
| 7,111,252 B1 | 9/2006 | Harris |
| 7,346,559 B2 | 3/2008 | Kraft et al. |
| 7,596,513 B2 | 9/2009 | Fargo |
| 7,865,399 B2 | 1/2011 | Crespo et al. |
| 8,065,200 B2 | 11/2011 | Schwartz |
| 8,218,005 B2 | 7/2012 | Royz et al. |
| 8,229,800 B2 | 7/2012 | Trotman et al. |
| 8,244,594 B2 | 8/2012 | Barron et al. |
| 8,260,689 B2 | 9/2012 | Dollens |
| 8,335,722 B2 | 12/2012 | Lee et al. |
| 8,396,758 B2 | 3/2013 | Paradise et al. |
| 8,504,288 B2 | 8/2013 | Kadous et al. |
| 8,554,639 B2 | 10/2013 | Dollens |
| 8,599,256 B2 | 12/2013 | Royz et al. |
| 8,606,642 B2 | 12/2013 | Siounis et al. |
| 8,694,373 B2 | 4/2014 | Umeda |
| 8,924,261 B2 | 12/2014 | Stinchcomb |
| 9,412,121 B2 | 8/2016 | Tatzel et al. |
| 9,430,752 B2 | 8/2016 | Soon-Shiong |
| 2002/0072974 A1* | 6/2002 | Pugliese, III .......... G06Q 30/02 705/14.16 |
| 2004/0114801 A1 | 7/2004 | Boose et al. |
| 2004/0199435 A1 | 10/2004 | Abrams et al. |
| 2008/0263125 A1 | 10/2008 | Nortrup |
| 2008/0306831 A1 | 12/2008 | Abraham |
| 2009/0265251 A1 | 10/2009 | Dunlap et al. |
| 2010/0030578 A1* | 2/2010 | Siddique ............ G06Q 10/0637 705/3 |
| 2010/0198626 A1* | 8/2010 | Cho ....................... G06Q 10/02 705/5 |
| 2011/0137753 A1* | 6/2011 | Moehrle ................ G06Q 30/02 705/27.1 |
| 2011/0145051 A1 | 6/2011 | Paradise et al. |
| 2011/0145093 A1 | 6/2011 | Paradise et al. |
| 2012/0047050 A1 | 2/2012 | Solomon |
| 2012/0185330 A1 | 7/2012 | Kleinrock et al. |
| 2012/0203760 A1 | 8/2012 | Abraham et al. |
| 2012/0215805 A1 | 8/2012 | Homma et al. |
| 2013/0151335 A1 | 6/2013 | Avadhanam et al. |
| 2014/0279256 A1 | 9/2014 | Akin |
| 2015/0142569 A1 | 5/2015 | Kim et al. |

OTHER PUBLICATIONS

Google Shopping search results, search for "tv" near New York, New York, from company web site, captured Jun. 15, 2014, Mountain View, California.

Joshi, Neel, Sing Bing Kang, C. Lawrence Zitnick, and Richard Szeliski, Image Deblurring using Inertial Measurement Sensors, ACM Transactions on Graphics, vol. 29, No. 4, Jul. 2010, New York, New York.

Karpenko, Alexandre, David Jacobs, Jongmin Baek, and Mark Levoy, Digital Video Stabilization and Rolling Shutter Correction Using Gyroscopes, Stanford Tech Report CTSR Mar. 2011, Sep. 2011, Palo Alto, California.

Internet Archive Wayback Machine record of Milo, product pages for mClerk, May 13, 2012, and mShop, Jun. 22, 2012, San Jose, California.

Milo, Local Shopping search results, search for "com" near Palo Alto, California, from company web site, captured Jul. 21, 2014, San Jose, California.

"van Wijk, Jarke J. and Wim A. A. Nuij, A Model for Smooth Viewing and Navigation of Large 2D Information Spaces, IEEE Transactions on Visualization and Computer Graphics, vol. 10, No. 4, Jul./ Aug. 2004, New York, New York.".

Ha, Young, Wi-Suk Kwon, and Sharron J. Lennon. "Online visual merchandising (VMD) of apparel web sites." Journal of Fashion Marketing and Management: An International Journal 11.4 (2007): 477-493.

Won Jeong, So, et al. "The role of experiential value in online shopping: The impacts of product presentation on consumer responses towards an apparel web site." Internet Research 19.1 (2009): 105-124.

* cited by examiner

SYSTEMS AND METHODS FOR FACILITATING THE RETAIL SHOPPING EXPERIENCE ONLINE

CROSS-REFERENCE TO RELATED PATENT APPLICATIONS

This application claims priority to and benefit of U.S. Provisional Patent Application No. 61/829,917, titled "SYSTEMS AND METHODS FOR FACILITATING THE RETAIL SHOPPING EXPERIENCE ONLINE," and filed on May 31, 2013, the entirety of which is hereby incorporated by reference.

FIELD OF THE DISCLOSURE

The present disclosure generally relates to online interfaces. More specifically, the present disclosure relates to selecting a search result through an online interface, and generating a notification through an interface.

BACKGROUND OF THE INVENTION

Online interfaces can select search results and generate notifications.

SUMMARY OF THE INVENTION

At least one aspect of the present disclosure is directed to systems and methods for selecting a search result. In some embodiments, the system includes a server. The server can be configured to access a data structure, storing product descriptions describing products in a retail store. The server can be configured to store an image including visual representations of the products. The server can be configured to associate image segments with the product descriptions, the segments including the visual representations. The server can be configured to associate classifications with the product descriptions. The server can be configured to display, responsive to input from a user, the image. The server can be configured to select, responsive to input from the user, the search result from the product descriptions. The server can be configured to order the search result, based on the classifications and the image segments associated with the product descriptions selected by the search result.

At least one aspect of the present disclosure is directed to systems and methods for generating a notification. In some embodiments, the system includes a server. The server can be configured to access a data structure storing, in a memory element, one or more product descriptions, the one or more product descriptions describing one or more products in a retail store. The server can be configured to select, via the data structure, responsive to input from a user, a search result from the one or more product descriptions. The server can be configured to associate, responsive to input from the user, one or more of the product descriptions selected in the search result with a user account, the user account associated with the user. The server can be configured to generate, responsive to the association, a notification based on the user account and the one or more product descriptions associated with the user account. The server can be configured to display, responsive to the generation, the notification at the retail store.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

In an illustrative example, a user may wish to find a product, but may desire to buy the product at a local retail store rather than buying the product online. For example, the user may want to support local retailers, or the user may want to have the product right away, or the user may want to see and touch the product before committing to the purchase. The user may use the present disclosure to search for the product using keywords, and may find the product in a number of retail stores nearby. The user may then look at the shelves of the stores where the product is listed, and may see similar products on the same shelf. The user may be interested in visiting one or more of the retail stores to see the product, and may get information about the stores from the online interface, such as the location, telephone number, and hours of the stores. The user may visit the stores immediately, or may instead decide to "bookmark" the stores for a later visit.

The system may record information about the actions of the user, and may provide useful feedback to the merchants at the retail stores. For example, the system may be able to indicate to the merchants which parts of the store the user found most interesting. When this information is aggregated over a number of users, it may be helpful in facilitating the merchant to improve the layout of the store and the products that the merchant stocks. The system may indicate to the merchant the geographic location of the users that are most interested in the store, which may facilitate the merchant in coordinating advertising campaigns.

The user may indicate an intent to purchase a product at a store. The system may alert the merchant that a customer is planning to purchase a product, which may facilitate the merchant in preparing for the customer visit and completing the sale. The system may have access to inventory information for the store, and may be able to accurately indicate to the user whether or not the product is currently available at the store.

The system may be able to track the location of the user, and remind the user about a "bookmarked" store when it is close by, so that the user can visit the store and complete the purchase. The system may also be able to track the user into the store, and may be able to track the purchases in the store. The merchant may be able to use this "conversion" information to better understand the effectiveness of the system, and also the effectiveness of marketing campaigns.

The user may not be looking for a specific product, but may search for general product terms to find certain types of stores in the area. The user may then be able to browse the shelves of the stores online to see what sort of products are available in the store. This may give the user a much better idea of what the stores are like, and whether or not the stores are interesting. This may serve as an effective way to market the store.

Figure 1A:
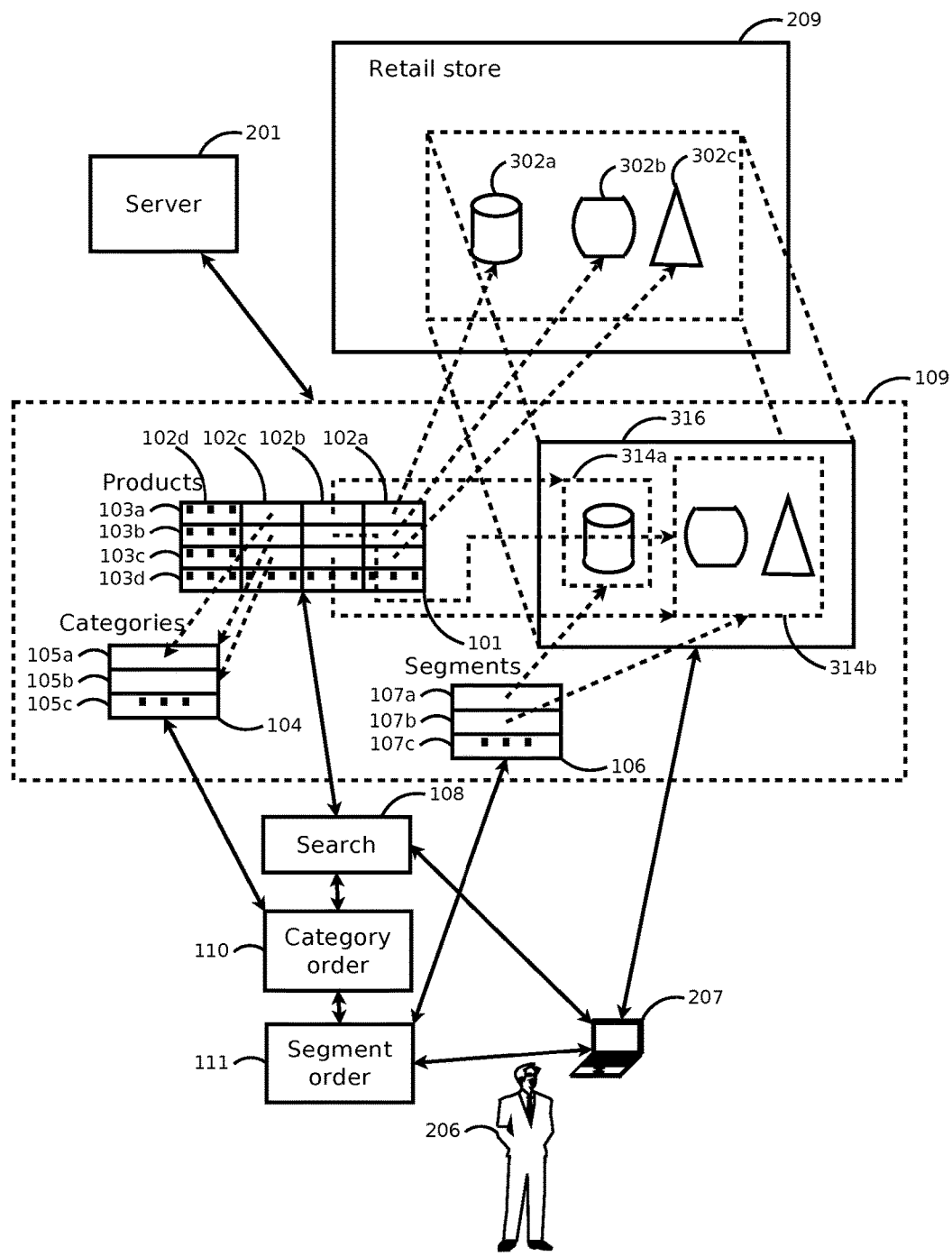
FIG. 1A is an illustrative block diagram of an embodiment of a system for facilitating the retail shopping experience online, and selecting a search result.

FIG. 1A is an illustrative block diagram of an embodiment of a system for facilitating the retail shopping experience online, and selecting a search result. A server 201 can access a data structure 109 that can contain a products table 101, a categories table 104, a segments table 106, and an image 316. A retail store 209 can contain products 302a-302c that may be arranged in the retail store in a manner conducive to their sale. The products table 101 can contain columns 102a-102d and can contain rows 103a-103d. Each row 103a-103d can correspond to a product 302a-302c in the retail store 209, and the row 103d is drawn in FIG. 1A in such a way to indicate that more rows may be added to the products table 101. Each row 103a-103d in the products table 101 may represent a product description, for which column 102a may be a reference to the corresponding product 302a-302c, column 102b may be a reference to a segment 314a-314b in the image 316, column 102c may be a reference to a category 105a-105c in the category table 104, and column 102d is drawn in FIG. 1A in such a way to indicate that more columns may be added to the products table 101. The image 316 may correspond to the appearance of the products 302a-302c in the retail store 209 and may contain visual representations of those products 302a-302c. The segment table 106 can contain rows 107a-107c which may contain references to image segments 314a-314b in the image 316. The row 107c is drawn in FIG. 1A in such a way to indicate that more rows may be added to the segments table 106. The categories table 104 can contain rows 105a-105c, which may contain categories of the products 302a-302c, and row 105c is drawn in FIG. 1A in such a way to indicate that more rows may be added to the categories table 104. A search engine 108 may select search results from the product descriptions 103a-103d in the products table 101. A category order module 110 may order the search results from the search engine 108, using the categories 105a-105c in the category table 104. A segment order module may order the search results from the search engine 108, using the segments 107a-107c from the segments table 106. The search engine 108 may be initiated by a user 206 using a device 207, and the search results from the search engine may be displayed to the user 206 using the device 207 after being ordered by the category order module 110 and the segment order module 111.

The server 201 and device 207 may communicate using a network. The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The one or more servers 201 do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

Figure 1B:
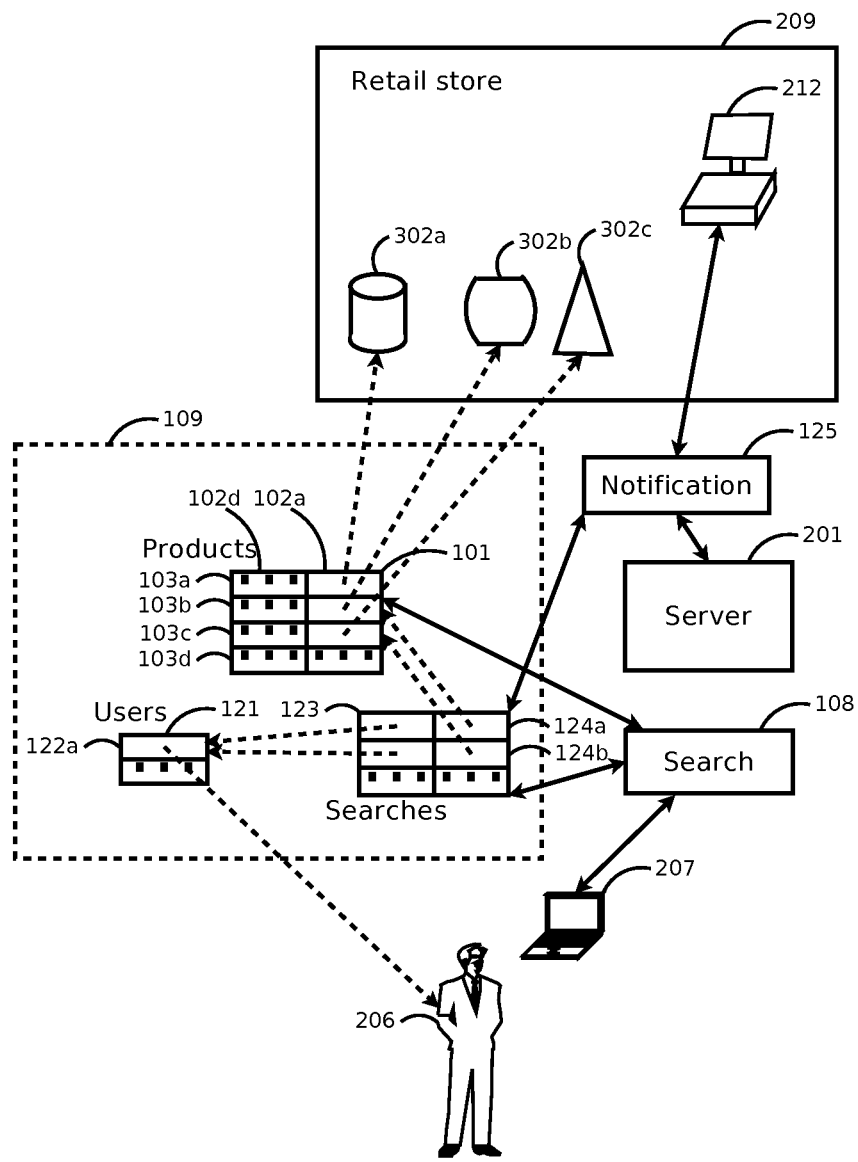
FIG. 1B is an illustrative block diagram of an embodiment of a system for facilitating the retail shopping experience online, and generating a notification.

FIG. 1B is an illustrative block diagram of an embodiment of a system for facilitating the retail shopping experience online, and generating a notification. A server 201 can access a data structure 109 that can contain a products table 101, a users table 121, and a searches table 123. A retail store 209 can contain products 302a-302c that may be arranged in the retail store in a manner conducive to their sale, and a point of sale (POS) system 212. The products table 101 can contain columns 102a-102d and can contain rows 103a-103d. Each row 103a-103d can correspond to a product 302a-302c in the retail store 209, and the row 103d is drawn in FIG. 1B in such a way to indicate that more rows may be added to the products table 101. Each row 103a-103d in the products table 101 may represent a product description, for which column 102a may be a reference to the corresponding product 302a-302c, and column 102d is drawn in FIG. 1B in such a way to indicate that more columns may be added to the products table 101. The users table 121 may contain rows 122a, and FIG. 1B is drawn in such a way as to indicate that more rows may be added to the users table 121. Each row 122a in the users table 121 may correspond to a user 206. The user 206 may initiate a search by the search engine 108, which may in turn select a search result from the products table 101. The product descriptions selected in the search result may be entered in a row 124a of the searches table, along with a pointer to the entry 122a in the users table 121 that corresponds to the user 206 that ran the search. In this way, the searches table 123 can maintain a list of the products 103a-103d along with the user 122a that searched in its rows 124a-124b. FIG. 1B is drawn in such a way as to indicate that the searches table 123 may have more rows added to it. The server 201 may use the searches table 123 to generate a notification 125 that can be sent to the POS terminal 212 in the retail store 209. In this way, the retail store 209 may be made aware that there is interest by a customer 206 in a product 302a-302c.

The system and its components, such as a server 201, data structure 109, search engine 108, category ordering module 110, segment ordering module 111, device 207, and notification module 125, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a server 201, data structure 109, search engine 108, category ordering module 110, segment ordering module 111, device 207, and notification module 125, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2:
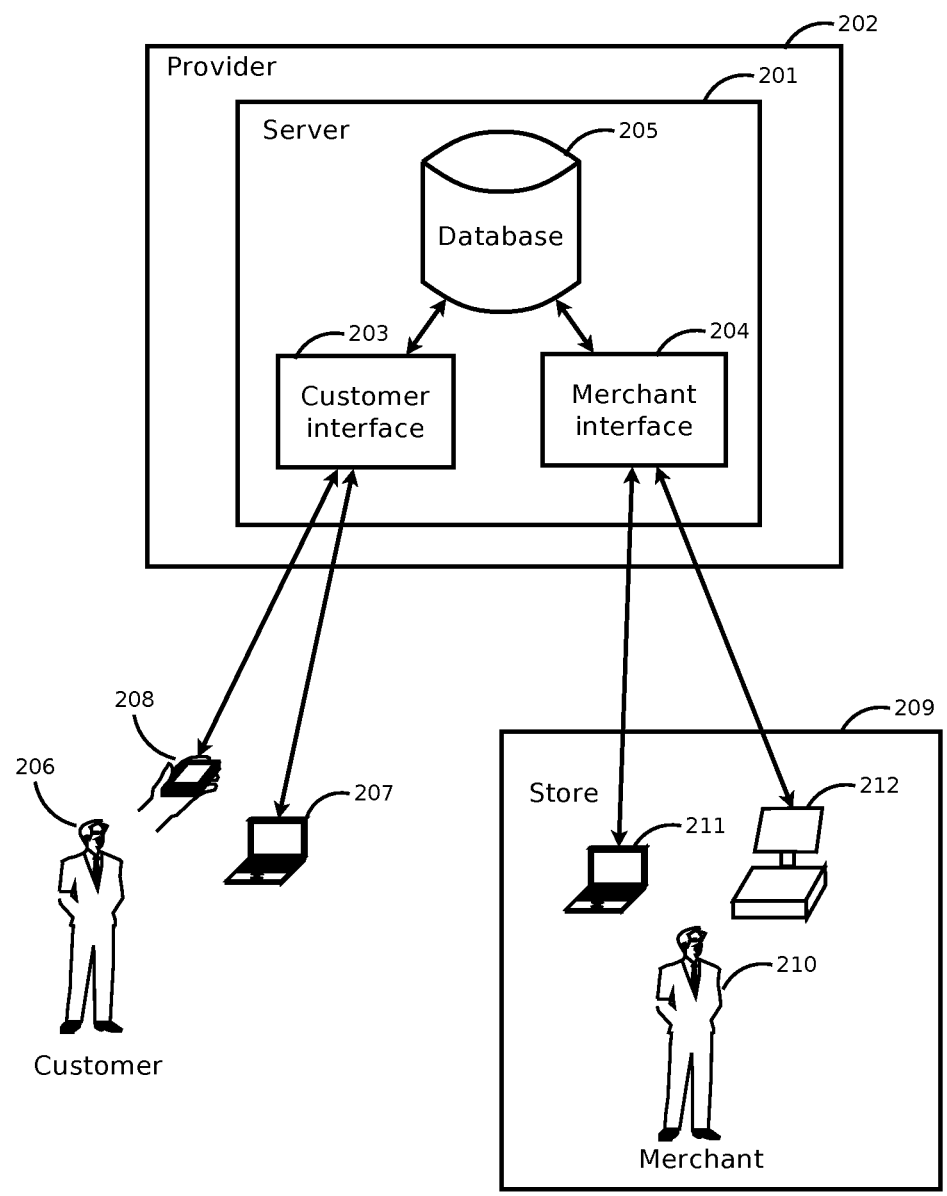
FIG. 2 is an illustrative block diagram of an embodiment of a system for facilitating the retail shopping experience online.

FIG. 2 is an illustrative block diagram of an embodiment of a system for facilitating the retail shopping experience online. The provider 202 of the system can use a server 201 to facilitate the retail shopping experience of a customer 206 at a store 209, which can be run by a merchant 210. The server 201 can provide a customer interface 203 and a merchant interface 204. The server 201 can also use a database 205 to store information. Access to the server 201 may be done through a network. The customer interface 203 and the merchant interface 204 may provide an interactive interface, which may use a protocol such as the Hypertext Transfer Protocol (HTTP). The customer interface 203 and the merchant interface 204 may also provide an application programming interface (API), which may use a protocol such as eXtensible Markup Language (XML). The customer 206 may access the customer interface 203 using devices 207 and 208. In one embodiment, device 207 is a desktop computer that runs a browser such as Internet Explorer by Microsoft Corporation of Redmond, Wash., which implements the HTTP protocol. In one embodiment, device 208 is a mobile device such as an iPhone by Apple Computer of Cupertino, Calif., running a custom application to implement client functions of an API. The merchant 210 may access the merchant interface 204 using devices 211 and 212. In one embodiment, device 211 is a desktop computer that runs a browser such as Internet Explorer by Microsoft Corporation of Redmond, Wash., which implements the HTTP protocol. In one embodiment, device 211 is a tablet computer such as an iPad by Apple Computer of Cupertino, Calif., which can run a browser such as Safari by Apple Computer of Cupertino, Calif., which implements the HTTP protocol. In one embodiment, device 211 is a mobile phone such as an iPad by Apple Computer of Cupertino, Calif., which can run a browser such as Safari by Apple Computer of Cupertino, Calif. In one embodiment, device 212 is a Point Of Sale (POS) system such as the Platinum Solo from AccuPOS of Los Angeles, Calif. Although FIG. 2 shows only one customer 206, one store 209, and one merchant 210, this is meant to be illustrative. The present disclosure is intended to encompass multiple customers, multiple stores, and multiple merchants, where one customer may interact with multiple stores and merchants, and one store may interact with multiple customers and may have multiple merchants.

Figure 3A:
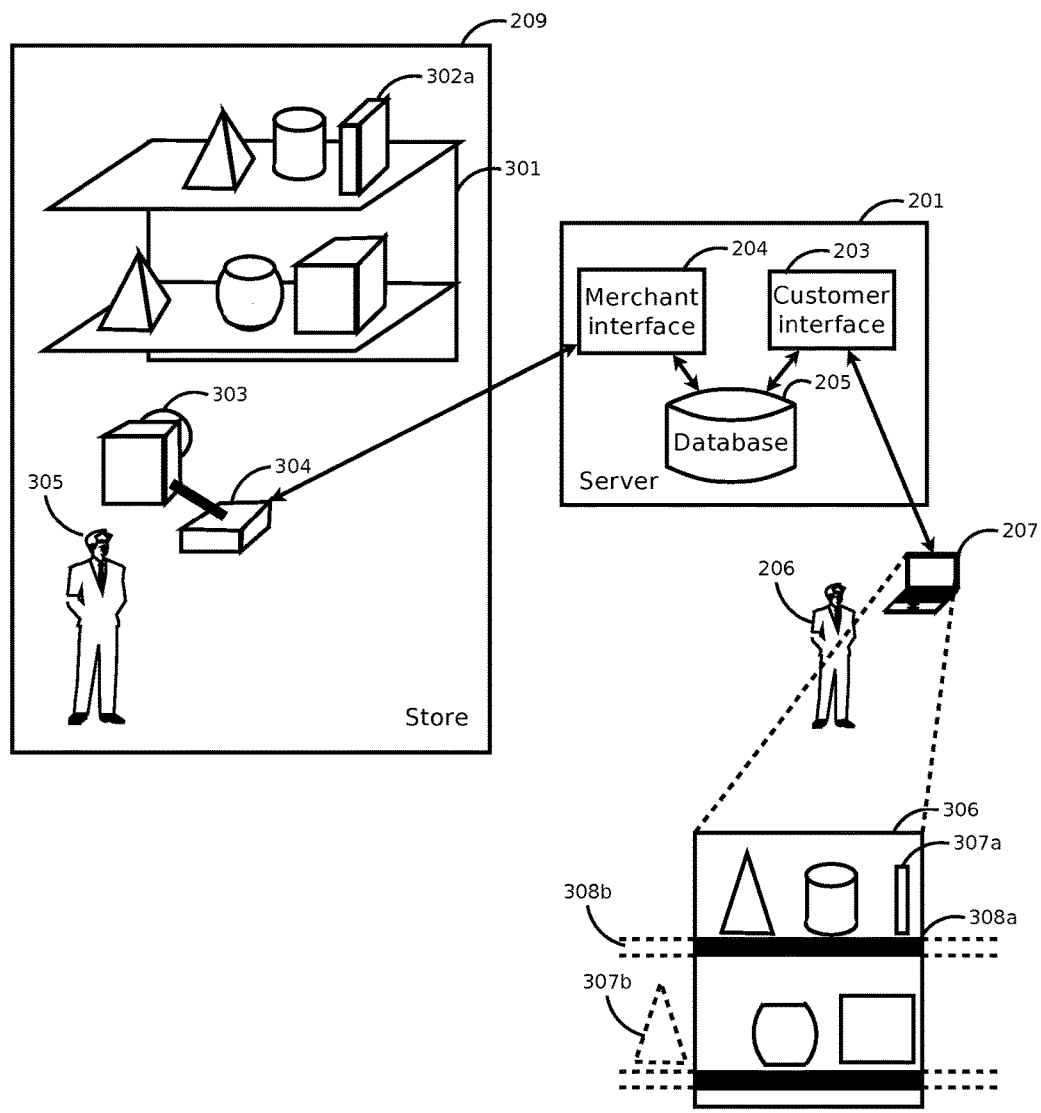
FIG. 3A is an illustrative block diagram of an embodiment of the capture and use of images of in-store inventory.

FIG. 3A is an illustrative block diagram of an embodiment of the capture and use of images of in-store inventory. A person 305 at the store 209, who may or may not be affiliated with the store 209, can oversee the process of using an imaging device 303, which may be supplemented with control and storage equipment 304, in order to capture images of in-store inventory 301. In one embodiment, the person 305 can be a merchant 210. In another embodiment, the person 305 can be an employee of the store 209. In another embodiment, the person 305 can be a customer 206. As exemplified in FIG. 3A, the in-store inventory 301 may be a shelf holding individual products such as 302a. The control and storage equipment 304 can send the captured images to the server 201 through the merchant interface 204. The server 201 may store the images in the database 205. The customer 206 may use a device 207 to access the customer interface 203. In response, the customer interface 203 may use the images from the database 205 to present a display 306 of the in-store inventory 301 to the customer 206. The in-store inventory 301 may be too large to fit into one display 306, so the information for the in-store inventory 301 may include both on-screen products such as 307a and on-screen image elements such as 308a, and off-screen products such as 307b and off-screen image elements such as 308b. The customer 206 can use controls on the display to access the off-screen display including products such as 307a and elements such as 307b, and make them visible on-screen.

Figure 3B:
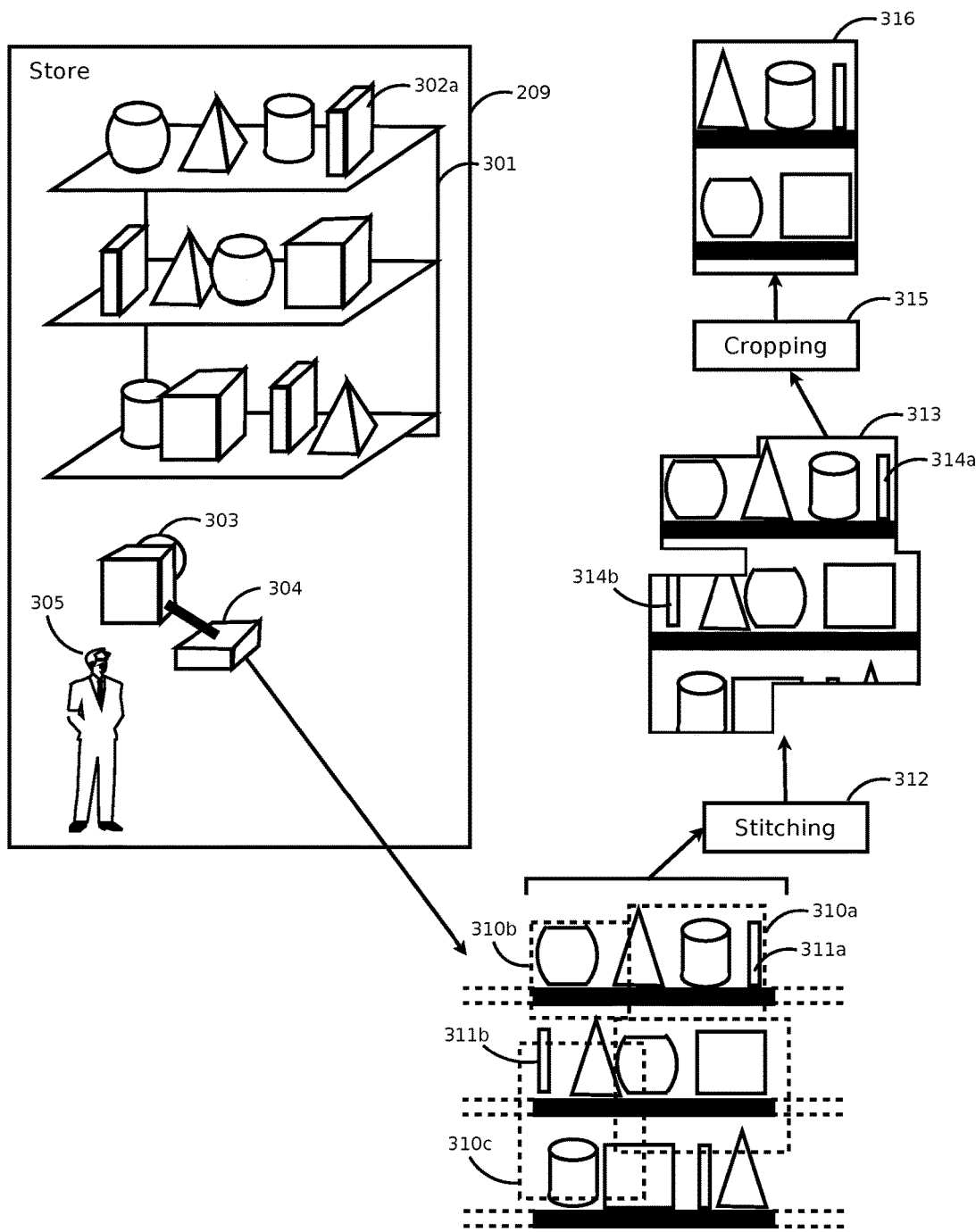
FIG. 3B is an illustrative block diagram of an embodiment of the use of multiple images to make a large image of in-store inventory.

FIG. 3B is an illustrative block diagram of an embodiment of the use of multiple images to make a large image of in-store inventory. The imaging device 303, which may be supplemented with control and storage equipment 304, is set up to take multiple images of the in-store inventory 301 at the store. In one embodiment, the imaging device 303 is a video camera, such as the NEX-7 by Sony Corporation of Tokyo, Japan, that is manually moved across the in-store inventory 301 by the person 305. In one embodiment, the imaging device 303 is a video camera built into a mobile device such as the iPhone by Apple Computer of Cupertino, Calif. In another embodiment, the imaging device 303 is a still-image camera, such as the EOS Rebel by Canon, Inc. of Tokyo, Japan, that is manually moved across the in-store inventory 301 and triggered manually by the person 305. In another embodiment, the imaging device 303 is a still-image camera that is manually moved across the in-store inventory 301 and triggered automatically based on position sensing of the imaging device 303. In one embodiment, the imaging device is a still-image camera built into a mobile device such as the iPhone by Apple Computer of Cupertino, Calif. In yet another embodiment, the imaging device 303 is a still-image camera on a pan/tilt/zoom mount such as the EPIC Pro by GigaPan of Portland, Oreg. In another embodiment, the imaging device 303 is a still-image camera on a sliding or "dolly" mount such as the Pocket Dolly Basic by Kessler Crane Inc. of Plymouth, Ind. In still another embodiment, the imaging device 303 is an array of still-image cameras in a multi-camera mount, where the array holding and controlling the cameras may be a custom-built array, and the still-image cameras may be cameras such as the HERO3 by GoPro of Riverside, Calif. In another embodiment, the imaging device 303 is a camera with a built-in multiple imaging element, such as the Lytro Camera by Lytro, Inc. of Mountain View, Calif. In one embodiment, the movement and triggering of the imaging device is controlled by an automatic system that can sequence zoom, pan, start and stop video, and trigger single-image operations.

The control and storage equipment 304 may collect the multiple images 310 from the imaging device 303. The images 310 may overlap, such as 310a and 310b, or they may be non-overlapping, such as 310b and 310c. An product in the in-store inventory such as 302a can appear in an image, such as image segment 311a, which represents the product 302a in image 310a. The representation can be complete and appear in a single image, as exemplified by 311a, which is complete and appears in image 310a. The representation may be incomplete and may appear in several images, as exemplified by 311b, which is missing a small part and appears partially in images 310a, 310b, and 310c.

The images 310 are used by a stitching module 312 to synthesize an image 313 that provides a representation of the appearance of in-store inventory 301 when moving across it in any direction. The stitching module 312 may need to do rotations, perspective transformations, sizing, or non-linear transformations of the image data 310 to create an image 313 that is visually correct and represents the in-store inventory faithfully. In the example of FIG. 3B, the in-store inventory product 302a becomes the image segment 314a in the stitched image 313 that is the output of the stitching module 312. The stitching module 312 may execute on the server 201, on the imaging device 303, on the control and storage equipment 304, or on some other processor.

The border of the stitched image 313 may not be smooth and rectilinear. In the example of FIG. 3B, the input images 310 did not completely cover the area of the in-store inventory 301, so the edges have some gaps. The customer display may require a rectangular image, so an additional cropping module 315 can be used to make the largest possible rectangular inventory image 316 from the stitched image 313. If the cropping module 315 is not required for the customer display, then the resulting inventory image 316 can be the same as the stitched image 313. The cropping module 315 may execute on the server 201, on the imaging device 303, on the control and storage equipment 304, or on some other processor.

The inventory image 316 may be very large and can represent the inventory along the entire length of the store 209, at a very high resolution. This may allow a customer 206 to experience a very realistic and engaging retail experience without physically being present at the store 209. The inventory image 316 can be viewed zoomed out all the way, to get an overview of the inventory 301, and it can be zoomed in to a level where details of the products 302 are visible. The inventory image 316 can be panned left and right, as if the customer 206 were walking past the inventory 301, and it can be panned up and down, as if the customer 206 were stooping down and standing up in front of the inventory 301. The result may be very compelling and helpful to a customer 206.

Figure 3C:
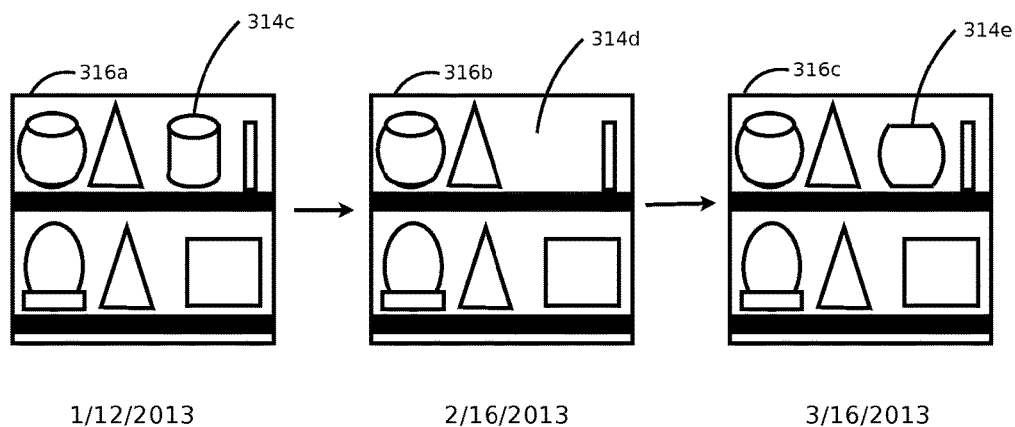
FIG. 3C is an illustrative block diagram of an embodiment of the capture of images of in-store inventory over a period of time.

FIG. 3C is an illustrative block diagram of an embodiment of the capture of images of in-store inventory over a period of time. The store 209 may update its inventory 301 or the positioning of products 302 in the inventory 301. When this happens, the merchant 210 may decide to update the inventory image data 316. In FIG. 3C, this is exemplified by an image 316a taken on Jan. 12, 2013, an image 316b taken on Feb. 16, 2013, and an image 316c taken on Mar. 16, 2013. Continuing the example of FIG. 3C, the product corresponding to the image segment 314c is removed sometime between Jan. 12, 2013 and Feb. 16, 2013, leaving an image segment with an empty space 314d. Continuing the example of FIG. 3C still further, sometime between Feb. 16, 2013 and Mar. 16, 2013, a different product is added, corresponding to the image segment 314e that replaces the empty space.

The system can make this image data over time 316a-316c available to customers 206. This may provide a shopping experience not available in a real store 209, namely, the ability to see what the inventory 301 looked like in the store 209 at some time in the past. For example, this may be very helpful for seasonal items such as fruits or clothing, to see what kinds of inventory 301 the store 209 has carried in the past, since the store 209 may carry some similar inventory 301 in the future. One example of this might be at a farmers' market, where a customer 206 might be able to check at the end of winter which vendors participated in the previous year, and what products they sold, before the market is even in operation.

Figure 4A:
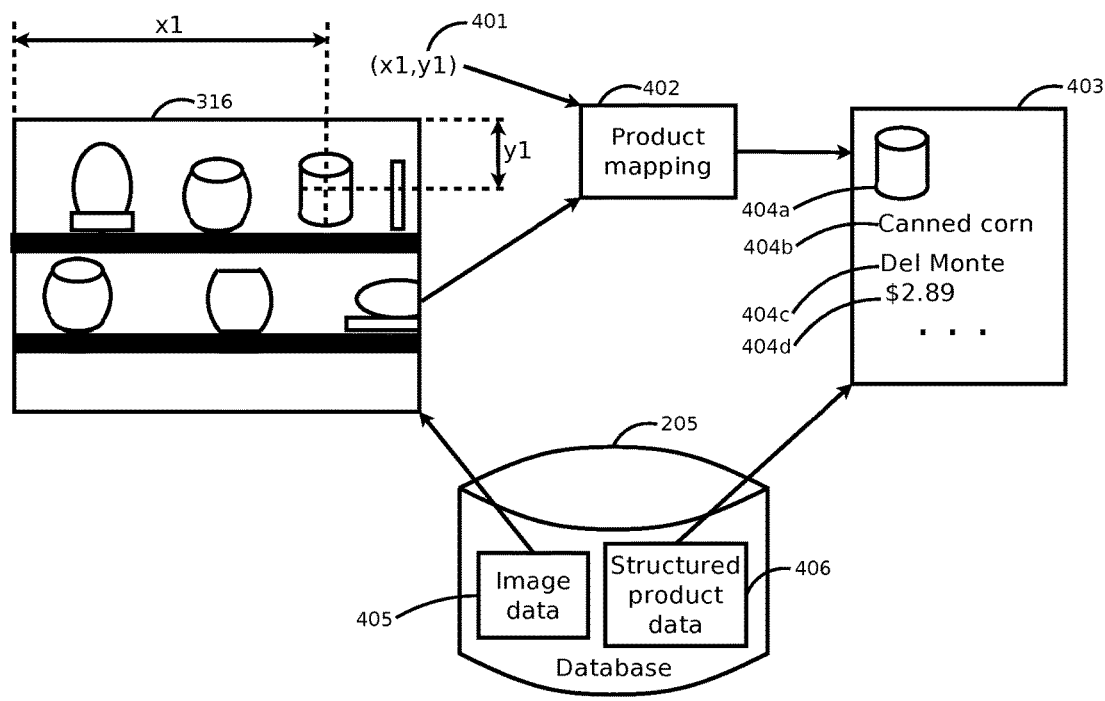
FIG. 4A is an illustrative block diagram of an embodiment of mapping a segment of an image of in-store inventory to product data.

FIG. 4A is an illustrative block diagram of an embodiment of mapping a segment of an image of in-store inventory to product data. The database 205 used by the system can contain both image data 405 of the inventory 301 in the store 209, and also structured product data 406 associated with the products 302 that are in the inventory 301. As exemplified in FIG. 4A, an item 403 of the structured product data 406 can contain an image 404a of the product, the name 404b of the product, the supplier 404c of the product, the retail price 404d of the product, and other data as indicated by the ellipsis. A product mapping module 402 can take an image 316 of the in-store inventory 301, and an identification 401 of a point within the inventory image 316, using the x-axis and y-axis offset of the point, and map the inventory image 316 and point 401 to structured product data 403 that represents the product corresponding to the image segment that is at point 401 in the inventory image 316.

The function of the product mapping module 402 may be very helpful to a customer 206, because it can enable the customer 206 to select an image segment 314 of interest in an inventory image 316, and see detailed information 404 in the structured product data 403 about the product corresponding to that image segment 314. The inverse function of mapping a product 403 to an image segment 314 in an inventory image 316 may also be very useful to a customer 206, because it can enable the customer 206 to search for a product using the text fields in the structured data 406, and see where the product 302 can be found in the store 209. This can be particularly useful when the product data 406 spans multiple stores 209, and the search results can show the stores 209 where the product 302 can be found, as well as where it can be found within the stores 209.

Figure 4B:
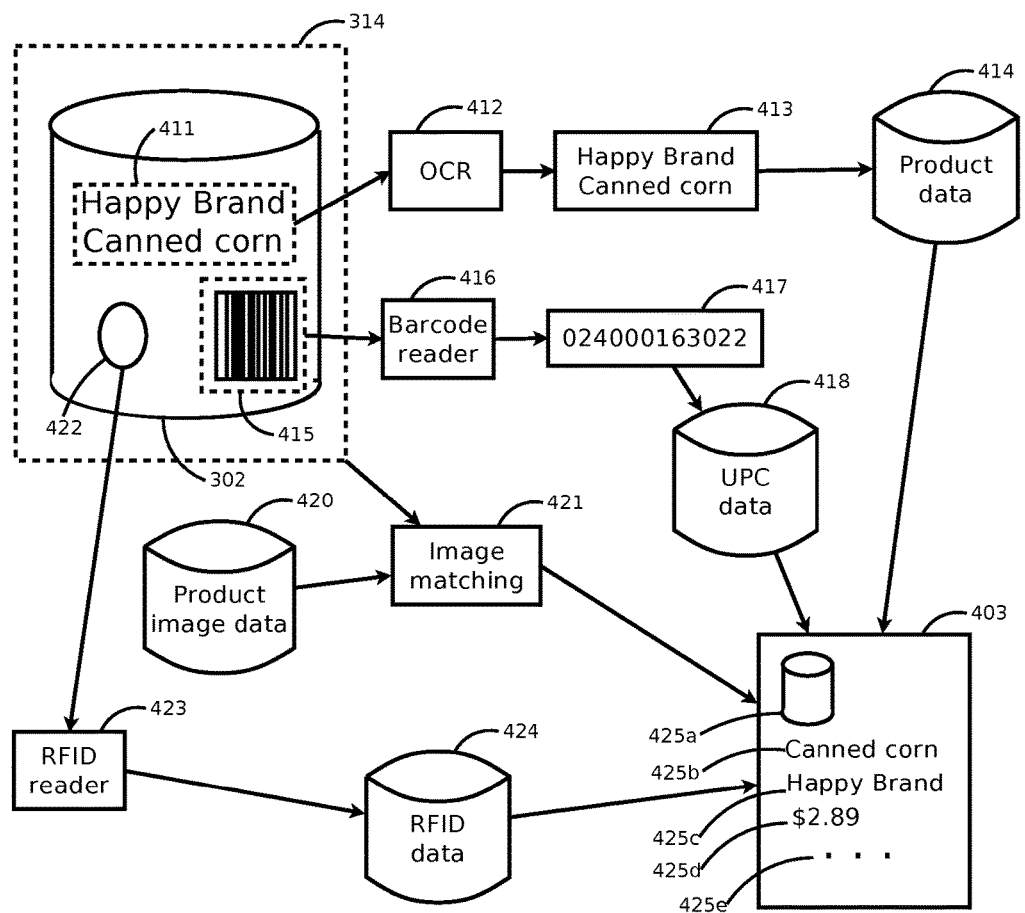
FIG. 4B is an illustrative block diagram of embodiments of systems for automatically mapping segments of images of in-store inventory to product data.

FIG. 4B is an illustrative block diagram of embodiments of systems for automatically mapping segments of images of in-store inventory to product data. The product mapping module 402 may be most useful and effective when the mapping can be set up automatically. The inventory image 316 can be segmented into smaller image segments 314, each one representing a single product 302. The image segment 314 may contain text 411 that can be located and recognized by an Optical Character Recognition (OCR) module 412. The OCR module 412 can convert the characters into machine-readable text 413, which can then be used to search a product database 414. Data from the product database 414 can then be used to provide the structured data 403 about the product. In one embodiment, the product database 414 is the inventory data for the store 209. In another embodiment, the product database 414 is a third-party product database, such as the Amazon Product Advertising API by Amazon Services of Seattle, Wash.

The image segment 314 may contain the Universal Product Code (UPC) for the product 302, encoded as a bar code 415. If the product 302 is a book, the identifier may instead be the International Standard Book Number (ISBN) for the book, encoded as a bar code. A bar code reader 416 can locate and recognize the bar code 415, converting it into a numeric UPC 417, which can then be used to search a UPC database 418. Data from the UPC database 418 can then be used to provide the structured data 403 about the product 302. In one embodiment, the UPC database 418 is the inventory data for the store 209. In another embodiment, the UPC database 418 is a third-party UPC database, such as the Internet UPC Database by upcdatabase.com of Weldon Spring, Mo.

The image segment 314 can be matched against product images in a product image database 420 using an image-driven search, such as the Google Image Search by Google, Inc. of Mountain View, Calif. A good match may be used to identify the product in the product image database 420, and then use the product data from the product image database 420 to provide the structured data 403 about the product. In one embodiment, the product image database 420 is the inventory data for the store 209. In another embodiment, the product image database 420 is a third-party database, such as the Amazon Product Advertising API by Amazon Services of Seattle, Wash.

The product 302 depicted in the image segment 314 may have a Radio Frequency IDentification (RFID) tag 422 with product identification information. An RFID reader 423 can read the product code information, which can then be used to search an RFID database 424. Data from the RFID database 424 can then be used to provide the structured data 403 about the product. In one embodiment, the RFID database 424 is the inventory data for the store 209. In another embodiment, the RFID database 424 is a third-party UPC database, such as the Internet UPC Database by upcdatabase.com of Weldon Spring, Mo.

In some embodiments not illustrated in FIG. 4B, the product information in the database 414, 418, 420, or 424 used to locate the product 302 may not be sufficient to provide the structured data 403 about the product 302. The database used to locate the product may provide a unique identifier sufficient to identify the product, and then that unique identifier may be used to find the structured data 403 in another database. For example, the product image database 420 may contain product images and UPC information, so the UPC information from the product image database 420 may be used to look up the structured data 403 in the UPC database 418.

Figure 4C:
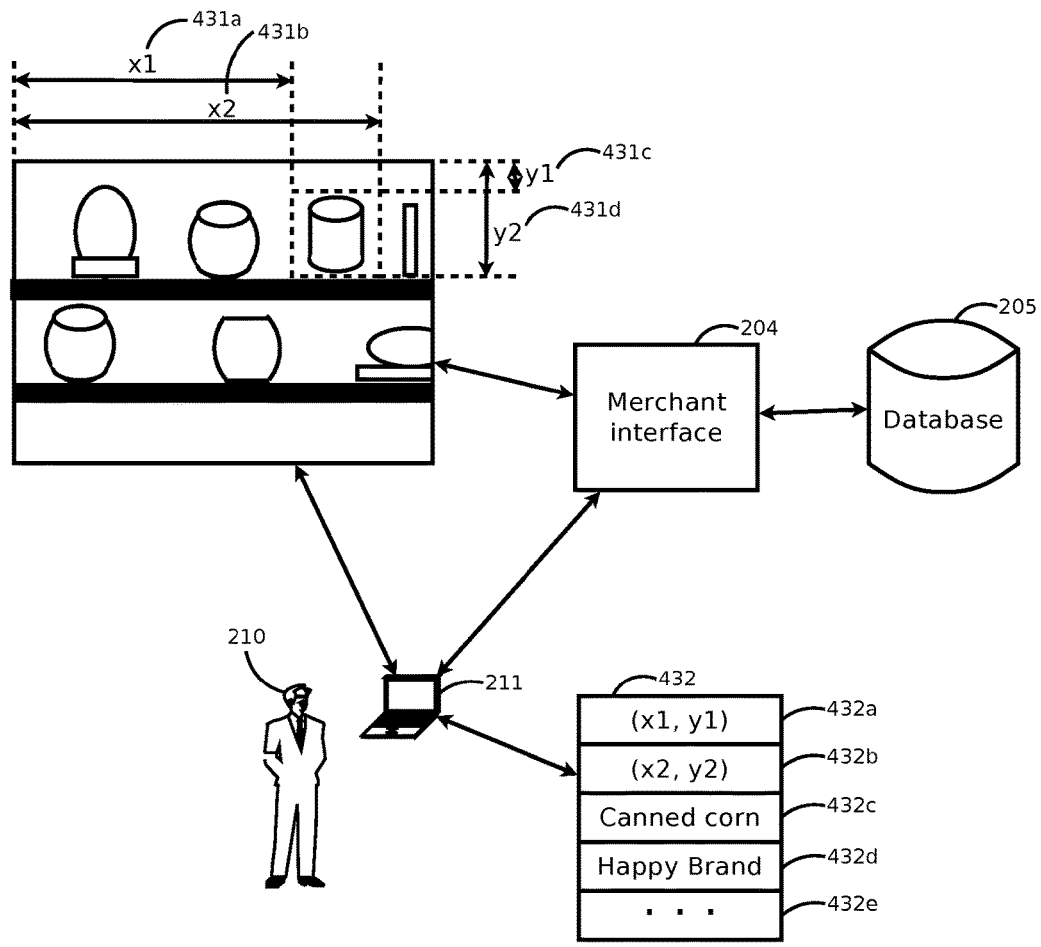
FIG. 4C is an illustrative block diagram of an embodiment of a system for manually mapping segments of images of in-store inventory to product data.

FIG. 4C is an illustrative block diagram of an embodiment of a system for manually mapping segments of images of in-store inventory to product data. A person 210 at the store, who may be the merchant, can manually provide the information for the product mapping module 402. The person 210 can use a device 211 to access the merchant interface 204. The merchant interface 204 can use image data 405 from the database 205 to present an inventory image 316 of the inventory 301 to the person 210. The person 210 can identify the bounding box for an image segment 314 that represents a single product 302, using a minimum bound 430a and maximum bound 430b on the x-axis, and a maximum bound 430c and minimum bound 430d on the y-axis. The person 210 can fill in a form 431 with the bounding box 431a, product name 431b, product supplier 431c, and other information as indicated by the ellipsis. The merchant interface 204 can store this information in the database 205 and the product mapping module 402 can use the information to look up structured product information 403 as previously described with respect to FIG. 4A.

In an embodiment not illustrated in FIG. 4C, instead of filling in a form 431, the person 210 may manually find enough identifying information about the product 302 to locate the product in a product database such as 414. Then, the product database 414 can be queried by the merchant interface 204 to find the structured data 403 to store in the database 205.

Figure 4D:
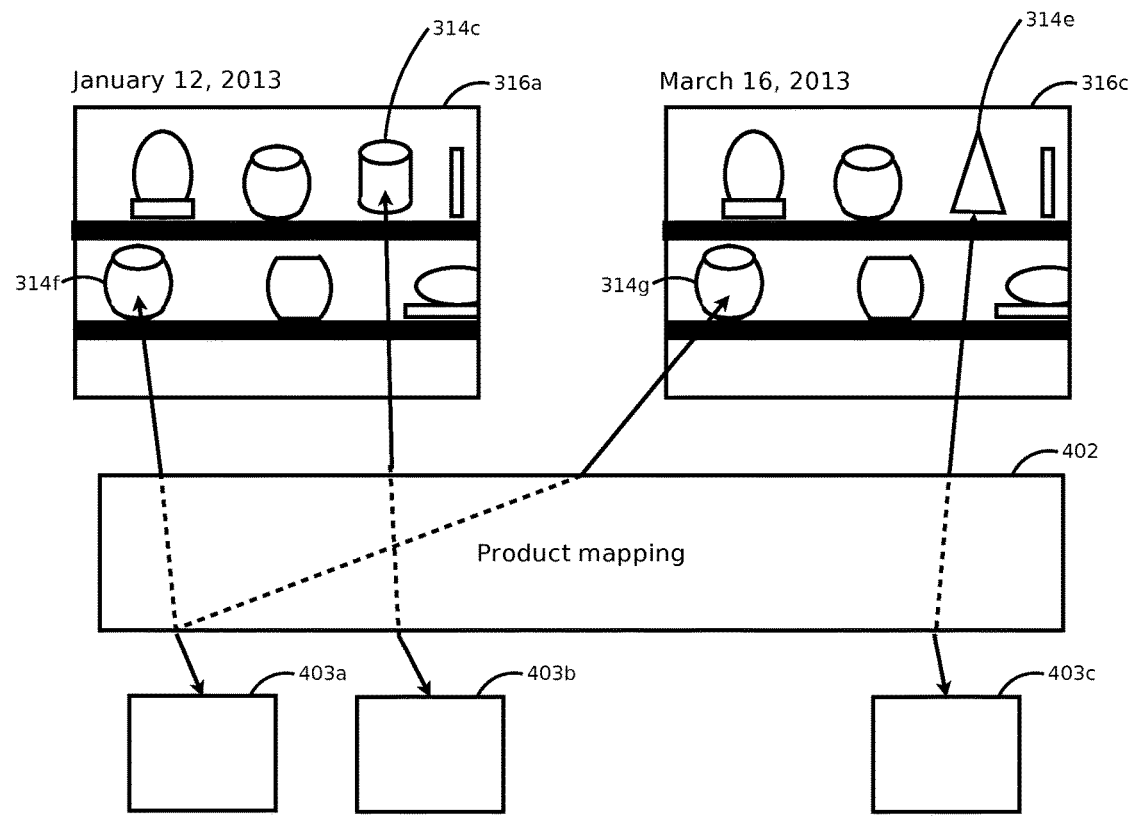
FIG. 4D is an illustrative block diagram of an embodiment of mapping segments of images of in-store inventory to product data over a period of time.

FIG. 4D is an illustrative block diagram of an embodiment of mapping segments of images of in-store inventory to product data over a period of time. As previously illustrated in FIG. 3C, the inventory image data 316 can be updated from time to time. When the inventory image data 316 is updated, it may not be necessary to update the product mapping function 402 for every image segment 314. For example, FIG. 4D shows an update of the inventory image data from 316a to 316c, where the image segment 314f becomes 314g, but the product does not change, and the image segment 314c becomes 314e, and the product does change. The system described with respect to FIG. 4B, for automatically creating the data for the product mapping function 402, can align the two inventory images 316a and 316c, and discover an image match between 314f and 314g. As a result, the two segments 314f and 314g can map to the same product 403a, and it may be that no additional work is needed to identify segment 314g. At the same time, the system may discover an image mismatch between the image segments 314c and 314e, so it can leave 314c mapping to product 403b, but may initiate a new automatic product mapping process on the image segment 314e, as described with respect to FIG. 4B, which may result in identifying a different product 403c to use for the mapping of the image segment 314e.

Figure 5A:
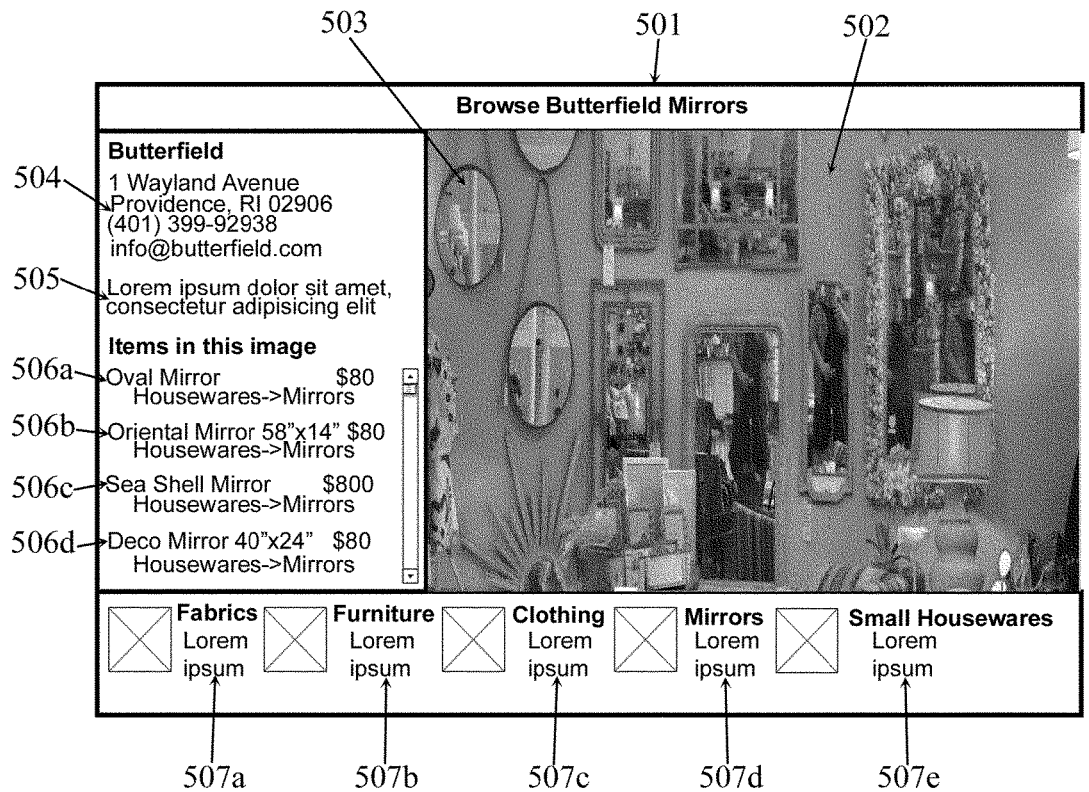
FIG. 5A is an illustrative example of an embodiment of a user interface for providing a customer with a retail browsing experience online.

FIG. 5A is an illustrative example of an embodiment of a user interface for providing a customer with a retail browsing experience online. The interface 501 presents several sections. The view 502 of the store 209 shows the inventory image data 316 for the in-store inventory 301, and provides pan and zoom controls to allow the customer 206 to simulate walking through the store 209 as previously described with respect to FIG. 3B. The customer 206 can view products in the image such as 503, and can click on a product to invoke the product mapping module 402 and navigate to the user interface described in FIG. 5C with structured information about the product. The sidebar shows contact information 504 and descriptive information 505 about the store 209, and lists structured information about the products 506 that are indicated by the product mapping module 402 to be in the visible part of the inventory image data 316. The customer 206 can click on a product 506 in the sidebar to navigate to the user interface described in FIG. 5C with structured information about the product. The bottom area of the user interface 501 shows an index 507 of the different inventory image images 316, which corresponds to different sections of the store 209, and are called "aisles" in the user interface to suggest a correspondence to aisles in the store 209. The customer 206 can select a different aisle 507, and the interface 501 will update both the store view 502 and the sidebar.

Figure 5B:
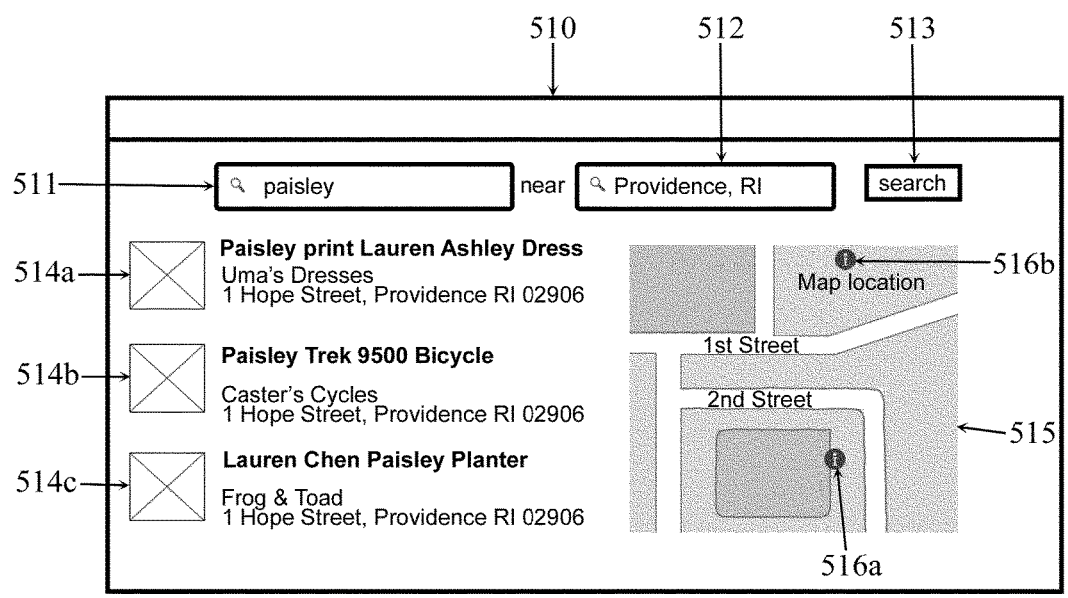
FIG. 5B is an illustrative example of an embodiment of a user interface for providing a customer with a search function spanning multiple retail stores.

FIG. 5B is an illustrative example of an embodiment of a user interface for providing a customer with a search function spanning multiple retail stores. The interface 510 allows the customer 206 to enter keywords 511 for search, and a location 512, which can be filled in with a default value, and click on the Search button 513 to start a search. The customer interface 203 searches the database 205 for structured text that matches the keywords 511, and displays the results 514 in a pre-determined order. Results 514 that have a geographic location associated with them can appear on a map 515 as markers 516 showing the location. For example, a search result 514 that is a product in a store 209 can show the location 516 of the store 209 on the map 515. The customer 206 can click on a search result 514 to navigate to the user interface described in FIG. 5C with structured information about the product.

The ordering of the search results 514 can be very important to the usability of the search. Search results 514 that are ordered in a way that better corresponds to what a customer 206 is looking for may make the search much more valuable because it can reduce the time spent and frustration encountered by customers 206 when they are looking for a product. Initially, the search engine can use a term frequency—inverse document frequency method for ordering the search results 514, as described by http://en.wikipedia.org/wiki/Tf-idf, but over time, the search engine can build a machine learning models of customers 206 and merchants 209, and use these machine learning models to weight the search results 514 to provide a better ordering. In one embodiment, these machine learning models can be developed to utilize geographic data, to account for regional differences in taste, culture, expectations, and so on. In one embodiment, these machine learning models can be developed to utilize demographic data about the customer 206, to account for differences based on age, gender, profession, income, and so on.

In one embodiment, the search results 514 can be ordered in a way to limit the number of results displayed for a single store 209. This may be helpful to a show a customer 206 more variety on the availability of the product. For example, a specialty store may have many different sizes and variants of a product, so the search results 514 might only show products from that specialty store. By limiting the number of results displayed for the specialty store, the search results 514 may include results from other stores. This may give the customer 206 more choices and may therefore be more helpful.

Figure 5C:
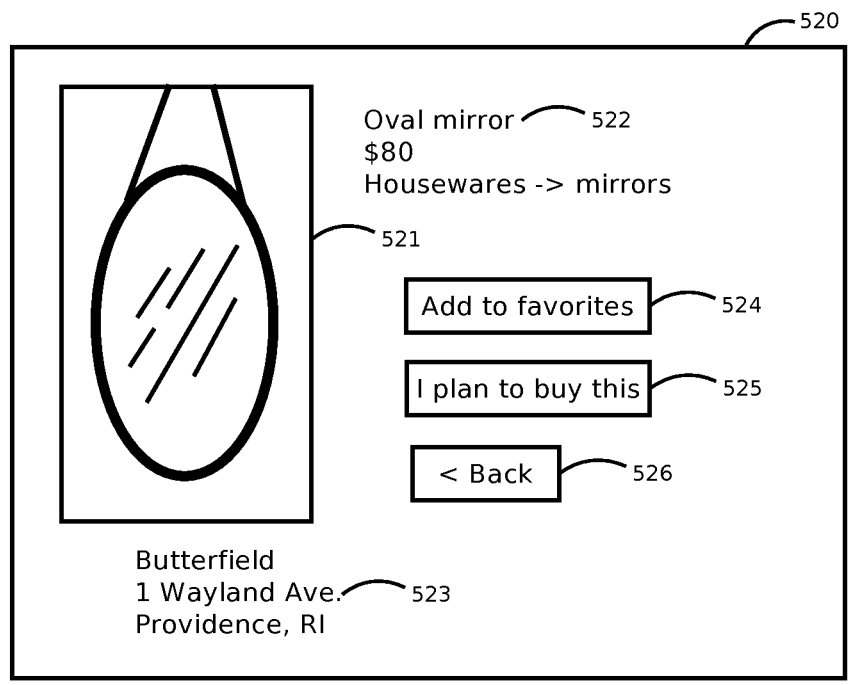
FIG. 5C is an illustrative example of an embodiment of a user interface for providing structured information about a product to a customer.

FIG. 5C is an illustrative example of an embodiment of a user interface for providing structured information about a product to a customer. The interface 520 can contain a picture 521 of the product. In one embodiment, the picture 521 is taken from the inventory image data 316. In another embodiment, the picture 521 is taken from a product database 414. The interface 520 can contain information 522 about the product, for example, the name and price of the product, and additional information as needed or available. The interface 520 can contain information 523 about the store 209 with the product. The interface 520 can contain a button "Add to favorites" 524 that the customer 206 can click on. Clicking on the "Add to favorites" button 524 can add the product to a list that the customer 206 can view quickly. The interface 520 can contain a button "I plan to buy this" 525 that the customer 206 can click on. Clicking on the "I plan to buy this" button 525 can send information to the merchant 210 that the customer 206 is planning to buy the product, and can also set up information on the customer's mobile device 208 about how to get to the store 209, as described with respect to FIG. 6. The interface 520 can contain a button "Back" 526 that the customer 206 can click on. Clicking on the "Back" button 526 can return the customer to the user interface screen that originally came to the product information interface 520.

Figure 5D:
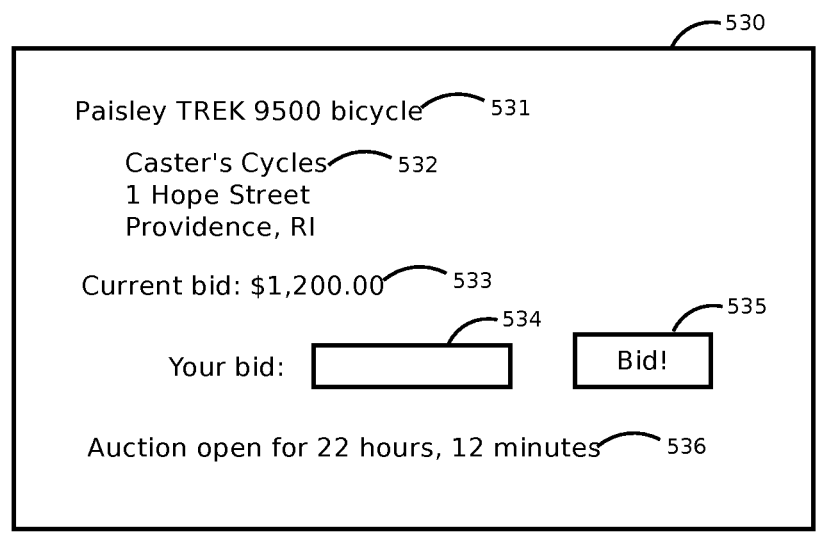
FIG. 5D is an illustrative example of an embodiment of a user interface for providing a customer with an online auction for a single retail product.

FIG. 5D is an illustrative example of an embodiment of a user interface for providing a customer with an online auction for a single retail product. A merchant 210 may want to let market forces determine the pricing of some products, for example, products that are in short supply and high demand. The user interface allows this function by displaying product information 531, store information 532, and the current bid 533 and time left in the auction 536 for a product. The customer 206 can enter a bid 534 and click on the Bid button 535 to bid for the item. This is not an online auction site such as the site from eBay, Inc. of San Jose, Calif., but is instead an online system for facilitating the auction function within a retail store 209.

Figure 6:
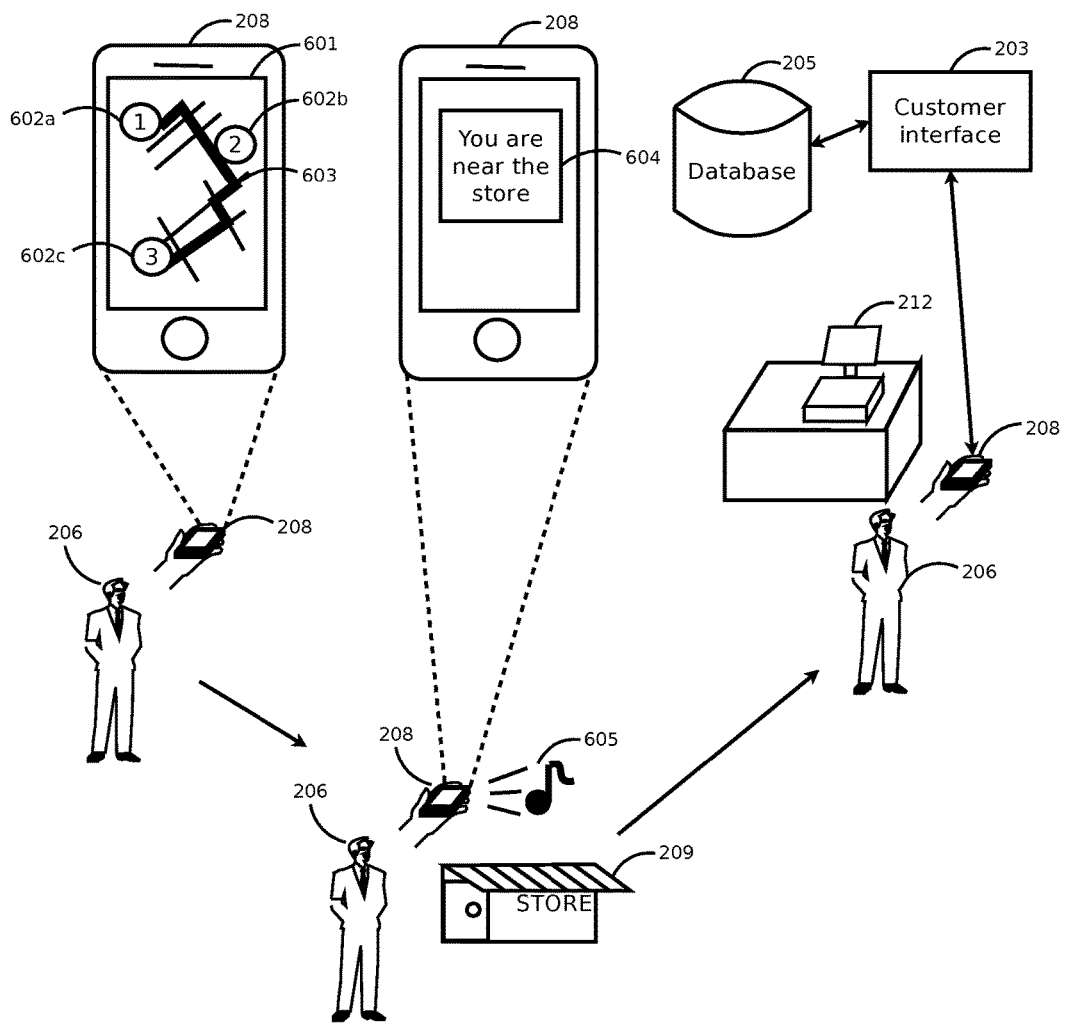
FIG. 6 is an illustrative block diagram of an embodiment of facilitating the customer shopping trip experience with online functionality.

FIG. 6 is an illustrative block diagram of an embodiment of facilitating the customer shopping trip experience with online functionality. The customer 206 may have indicated interest in some number of products at one or more stores, by clicking on the "I plan to buy this" button 525 in the product user interface 520. The system can now provide a "shopping trip" map 601 on the mobile device 208 of the customer 206. The map 601 can display markers 602 indicating the locations of the stores 209 with the products of interest, and can also display a route 603 for efficiently visiting the stores 209.

When the customer 206 is traveling, the system can generate an alert when the customer 206 is in the general vicinity of one of the stores 209 with a product for which the customer 206 has indicated an interest. The alert can be an audible tone 605 or a visual alert 604, or both. The alert may remind the customer 206 about the earlier interest in the product, and may entice the customer 206 to visit the store 209. In one embodiment, the geographic alerts can be implemented using the region monitoring interface of the iOS operating system by Apple Computer of Cupertino, Calif. In one embodiment, the alert function can be implemented using the push notification interface of the iOS operating system by Apple Computer of Cupertino, Calif. In another embodiment, the alert function can be implemented using the Cloud to Device interface of the Android operating system by Google, Inc. of Mountain View, Calif.

Once inside the store 209, the customer may purchase the item of interest, or another item. The mobile device 208 may communicate with the POS system 212, for example, using Near Field Communications (NFC), to verify presence in the store 209 and to verify the purchase transaction. The mobile device 208 may use its location services to verify physical presence in the store 209. The mobile device 208 can communicate with the customer interface 203 to record the transaction. This is called a "conversion" and tracking it in this way may be very valuable to the merchant 210 because it provides information about a marketing effort that was successful in attracting a customer 206 and closing a sale.

Figure 7A:
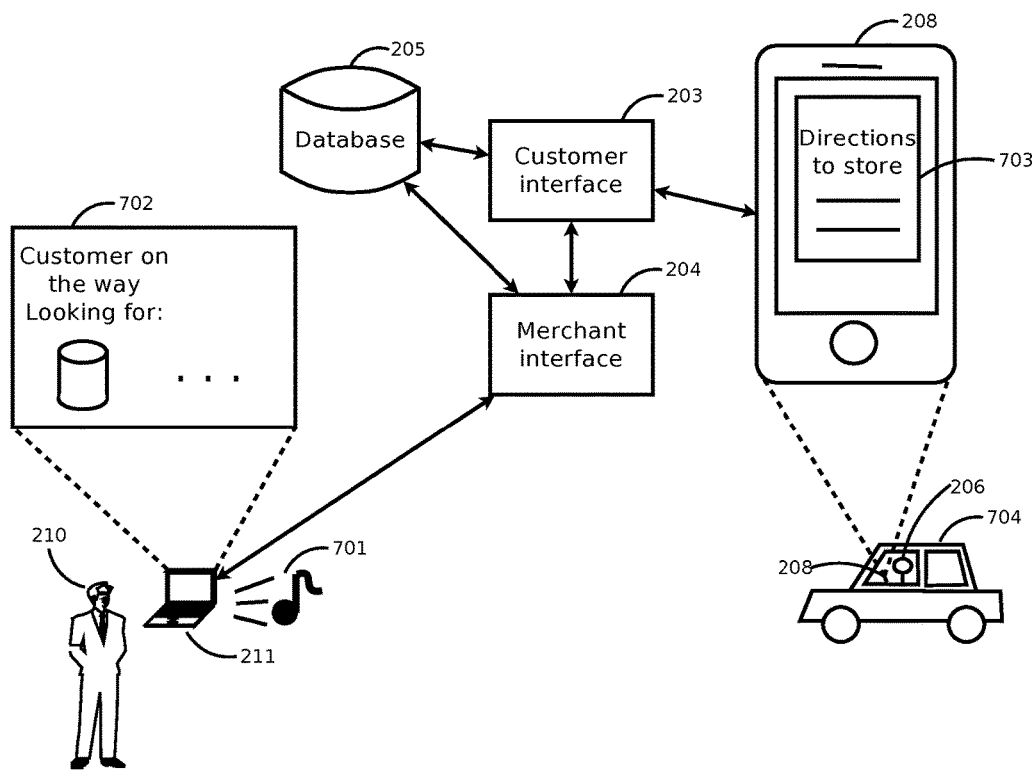
FIG. 7A is an illustrative block diagram of an embodiment of facilitating the merchant customer service with online functionality.

FIG. 7A is an illustrative block diagram of an embodiment of facilitating the merchant customer service with online functionality. The customer 206 may indicate a desire to buy a product at a particular store 209 using the customer interface 203. The customer interface 203 can provide directions 703 to the store using the mobile device 208 of the customer 206. The directions 703 may take multiple forms; for example, the directions 703 may be driving directions, or they may be walking directions, or they may be bicycling directions, or they may be directions for using public transit. The customer can then drive 704 to the store. At the same time, the intent to purchase can be stored in the database 205, and the merchant interface 204 can generate an alert for the merchant 210 at the store 209 where the customer 206 is going. The alert can be an audible alert 701 as well as a visual display 702. The visual display 702 can provide information about the customer 206, the product that the customer 206 wants to buy, other products that the customer 206 has shown an interest in, and so on. When the customer 206 arrives at the store 209, the merchant 210 can greet the customer 206 and provide personalized service in a very helpful and pleasant way.

Figure 7B:
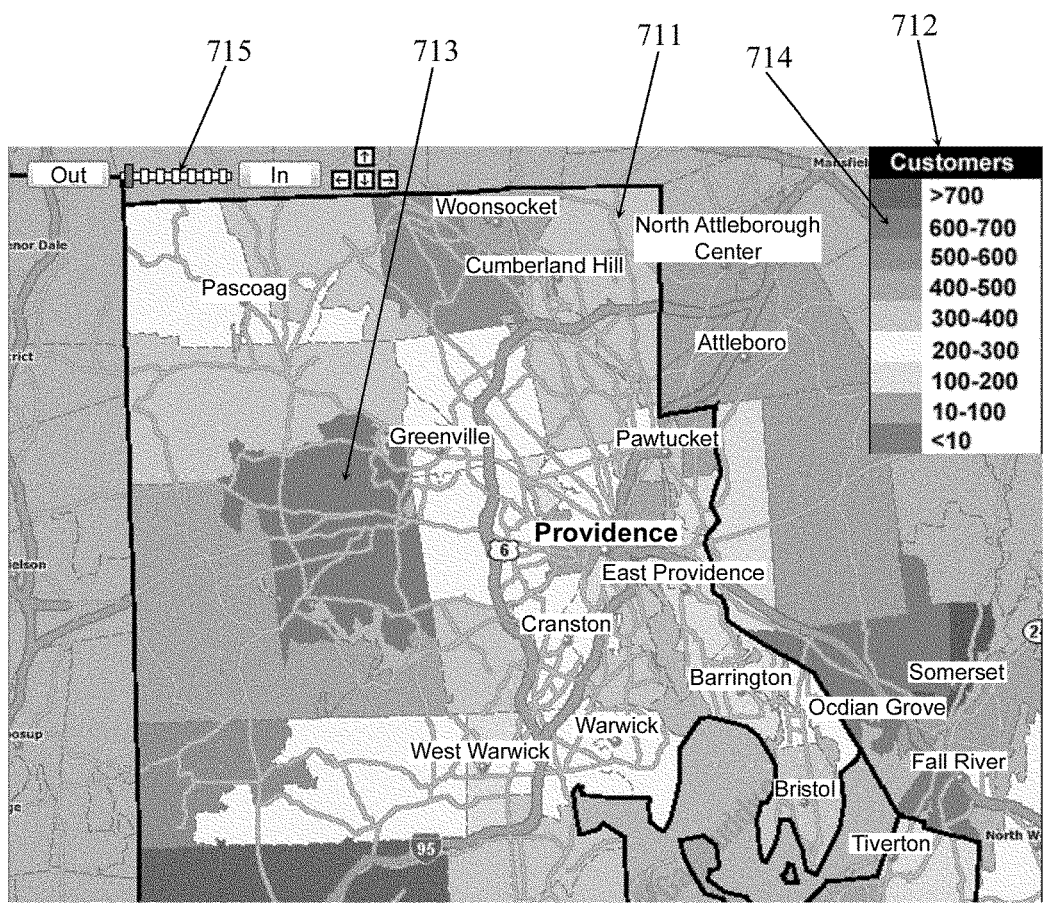
FIG. 7B is an illustrative example of an embodiment of a user interface for providing a merchant with a heat map of geographic customer demographic information.

FIG. 7B is an illustrative example of an embodiment of a user interface for providing a merchant with a heat map of geographic customer demographic information. The map shows the merchant 210 where customers 206 live who are expressing interest in the products in the store 209. Different areas such as 711 and 713 have different colors indicating the number of customers that live in that area. The legend 712 explains the meaning of the colors. For example, 714 is a color indicating that between 600 and 700 customers live in the area, and section 713 uses that color, indicating that many people living in that area are interested in the products of the merchant 210. Although FIG. 7B is black and white, heat maps may be presented with colors to make them more interesting and readable. The zoom and pan controls 715 can allow the merchant 210 to look around the map and look in more detail at sections of the map.

Figure 7C:
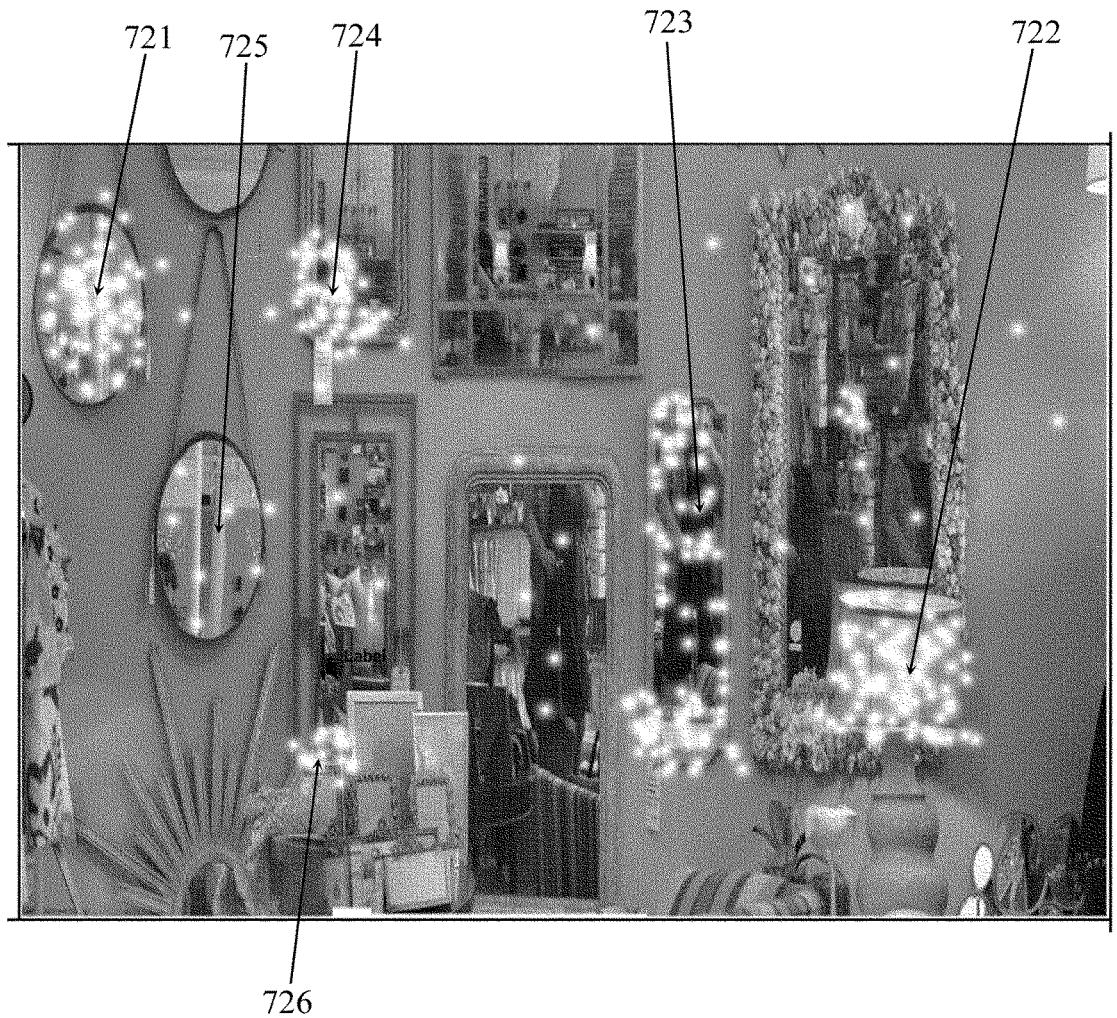
FIG. 7C is an illustrative example of an embodiment of a user interface for providing a merchant with a click map of customer interaction with online product information.

FIG. 7C is an illustrative example of an embodiment of a user interface for providing a merchant with a click map of customer interaction with online product information. The click map can show the merchant 210 which parts of the inventory image data 316 customers 206 are indicating their interest by clicking on the display. This may be helpful to the merchant 210 in understanding what parts of the store are good and bad at gaining the attention of customers 206, and therefore can help the merchant 210 to make a more attractive retail display. In FIG. 7C, the mirror 721 and the lamp 722 may have commanded the attention of many customers 206. Something unusual about the lower left corner of the mirror 724 may be attracting attention. The mirror 723 also may be popular, but may attract the most attention at its top and bottom. The interest in item 726 may be a surprise to the merchant 210 in that it is not really set up for retail display yet, but it has attracted quite a bit of attention from customers 206.

Figure 7D:
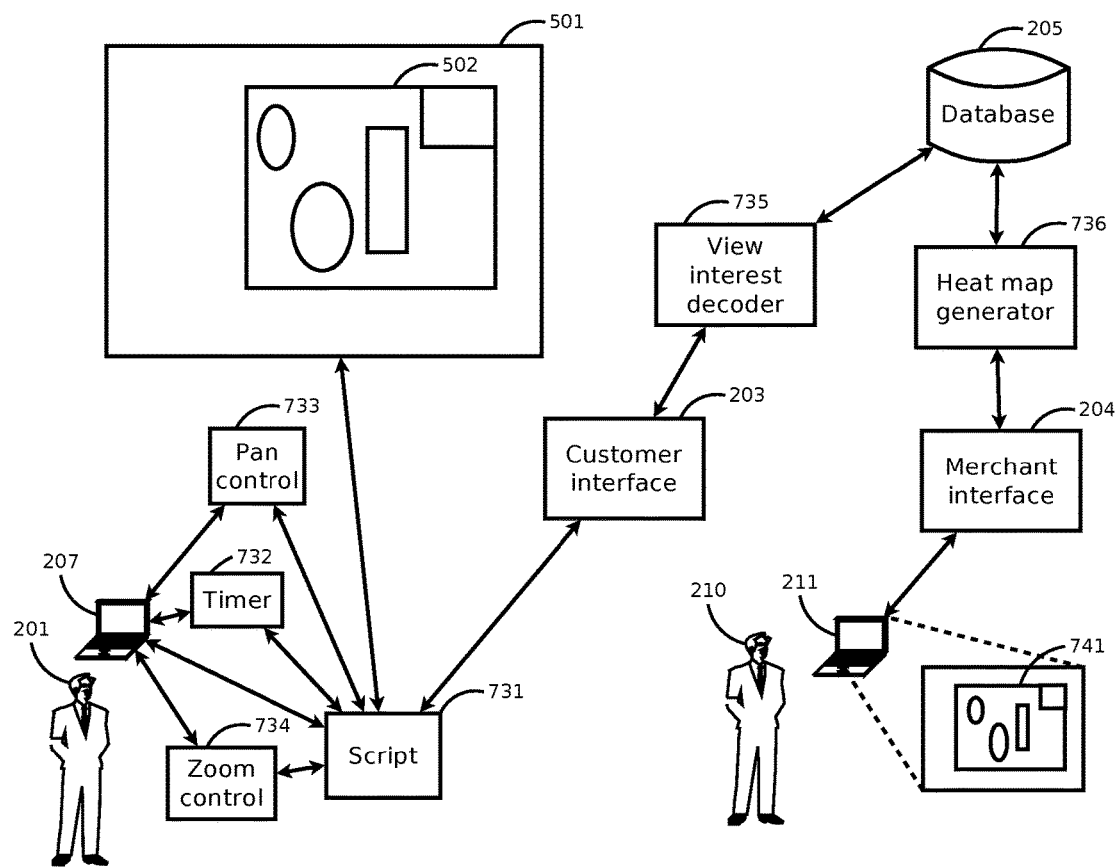
FIG. 7D is an illustrative block diagram of an embodiment of capturing information about customer interest in online product information.

FIG. 7D is an illustrative block diagram of an embodiment of capturing information about customer interest in online product information. The user interface 501 used by the customer 206 can be generated by a script 731 that executes on a device 207 used by the customer 206. As illustrated previously in FIG. 5A, the user interface 501 can contain an area 502 with image data representing the in-store inventory 301, and providing zoom and pan controls for the customer 206 to navigate in the image. The navigation input from the customer 206 can be handled by a zoom control 734 and a pan control 733 that both generate events in the script 731. The script 731 can control the image display 502 in response to the inputs 733 and 734, and it can also integrate timer information 732 to accurately record which parts of the image data the customer 206 looks at, and how long the customer 206 spends looking at each part of the image data. The script can send this information to the customer interface 203, where a view interest decoder module 735 can interpret the data and store it in the database 205. This data may be of interest to the merchant 210, who may be able to use it to understand which parts of the retail display in the store 209 are working well, and which parts need improvement. The merchant 210 can access this information using a device 211 to communicate with the merchant interface 204, which uses a heat map generator module 736 to retrieve the information from the database 205 and generate a display 741 for the merchant 210 that highlights the areas of the image where customers 206 have focused the most interest.

Figure 7E:
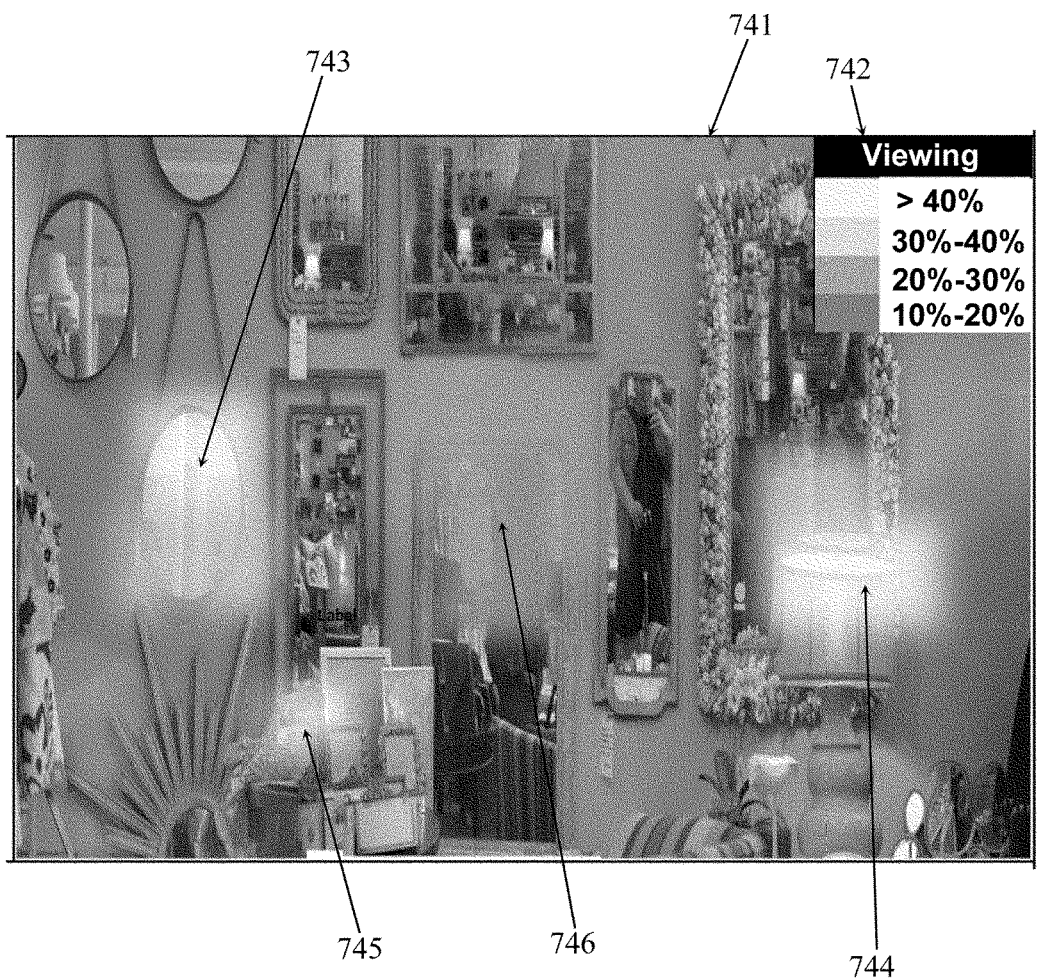
FIG. 7E is an illustrative example of an embodiment of a user interface for providing a merchant with a heat map of customer interest in online product information.

FIG. 7E is an illustrative example of an embodiment of a user interface for providing a merchant with a heat map of customer interest in online product information. The interface 741 shows the inventory image data 316 representing the in-store inventory 301, highlighted with colors 743-746 that indicate how much time customers 206 have spent looking at various parts of the image. The legend 742 explains the meaning of the highlight colors. In the example shown in FIG. 7E, the top part of the mirror 743 and the top right part of the lamp 744 have had the most attention from customers 206. Continuing the example, the top part of the long mirror 746 has gotten some attention, and the area 745 has gotten a surprising amount of attention, given that no particular product is there. Although FIG. 7E is black and white, heat maps may be presented with colors to make them more interesting and readable.

Figure 7F:
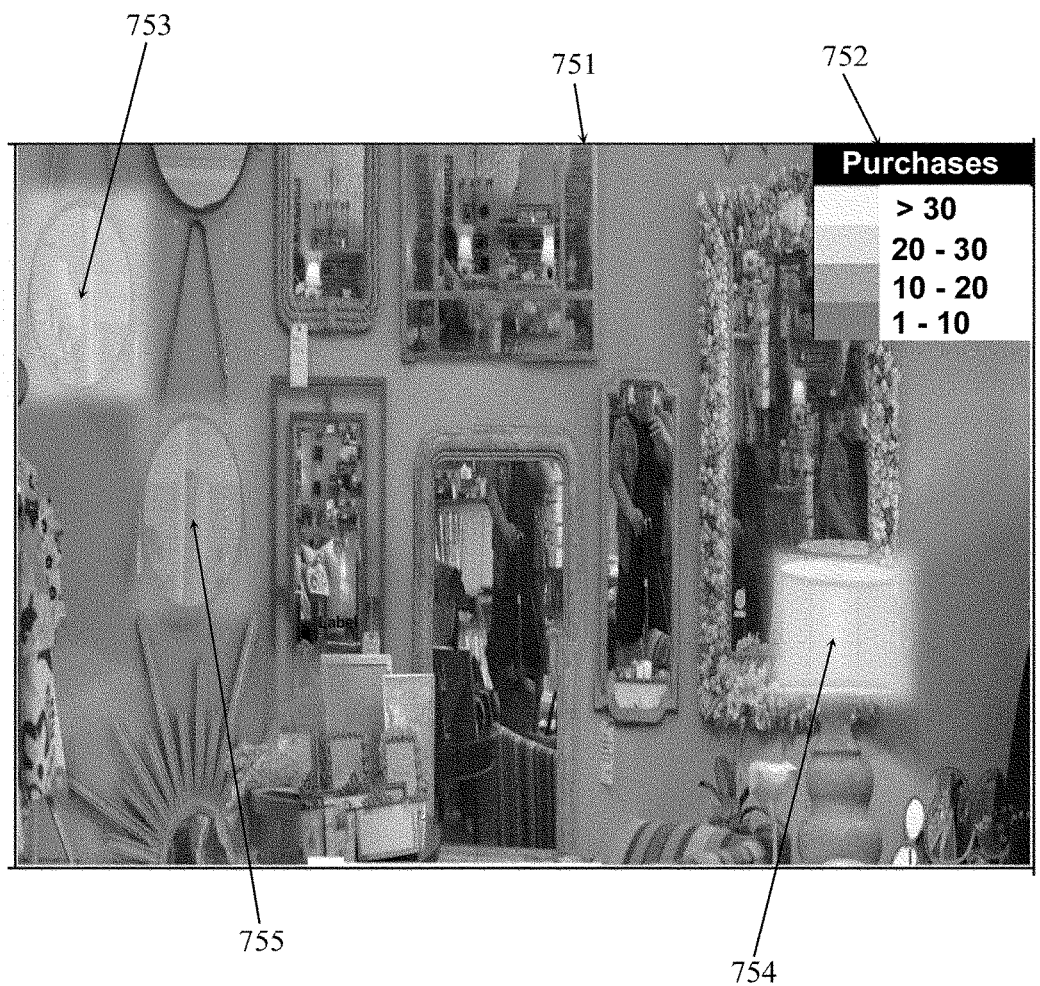
FIG. 7F is an illustrative example of an embodiment of a user interface for providing a merchant with a heat map of customer purchases driven by online product information.

FIG. 7F is an illustrative example of an embodiment of a user interface for providing a merchant with a heat map of customer purchases driven by online product information. The interface 751 shows the inventory image data 316 representing the in-store inventory 301, highlighted with colors 753-755 that indicate which segments of the image have resulted in purchases by customers 206. The legend 752 explains the meaning of the highlight colors. In the example shown in FIG. 7F, the lamp 754 has generated the most amount of interest resulting in a purchase, the mirror 753 has generated the next largest amount of interest resulting in a purchase, and the mirror 755 has generated the next largest amount of interest resulting in a purchase. The display 751 may help the merchant 210 understand and improve the layout of the retail display in the store 209, and may help to improve sales by making the product presentation more attractive to customers 206. Although FIG. 7F is black and white, heat maps may be presented with colors to make them more interesting and readable.

Figure 7G:
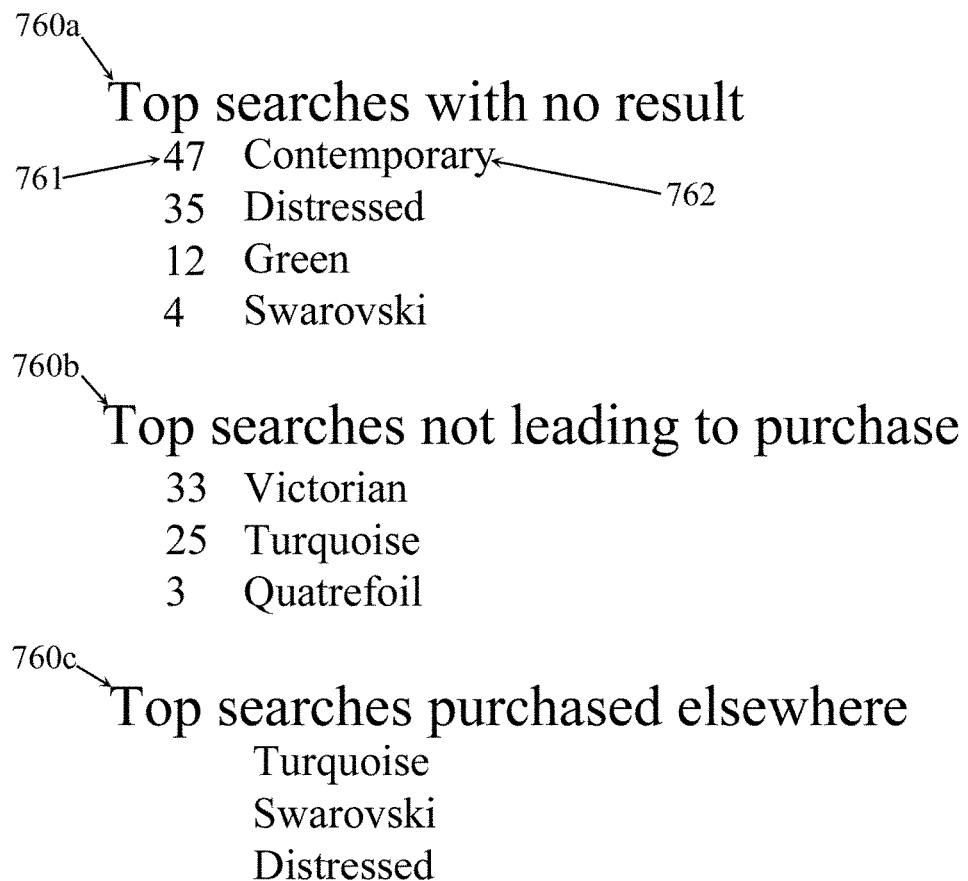
FIG. 7G is an illustrative example of an embodiment of a user interface for providing a merchant with information about customer searches that did not lead to a purchase.

FIG. 7G is an illustrative example of an embodiment of a user interface for providing a merchant with information about customer searches that did not lead to a purchase. The categories 760 of the information can be shown, with the search terms 762 and the count of searches 761 underneath the categories 760.

The categories may include "Top searches with no result" 760a, which is a list of search terms that customers 206 entered but found no result in the store 209. These may be interesting for the merchant 210 to help improve search results. For example, in FIG. 7G, the merchant 210 may not care that there were no results for "Contemporary" because the store 209 is an antique store with no contemporary designs. However, the merchant 210 may notice that customers are looking for "distressed" products, which are in the store 209 but are not described that way in the product information. As a result, the merchant 210 may want to review the product information and update appropriate products to include the term "distressed".

The categories may include "Top searches not leading to purchase" 760b, which is a list of search terms for which customers 206 found products in the store 209, but decided not to purchase these products. These may be interesting for the merchant 210, because they may indicate products in the store 209 that are not displayed well or are not the right kind of product for the customers 206. For example, in FIG. 7G, the merchant 210 may notice that although the store has a selection of Victorian items, they are not selling very well even though customers 206 find them with the keyword "Victorian". The merchant 210 may decide to change the display of the Victorian products, try discounting them, change the styles that the store 209 carries, or some other remedy.

The categories may include "Top searches purchased elsewhere" 760c, which is a list of search terms that produced results both in this store and other stores, and ultimately led to a purchase in another store. These search terms may not include counts, because the counts could reveal information about competitive stores that may be considered proprietary by those stores. This list may be interesting for the merchant 210, because it can reveal areas where the store 209 is underperforming the competition for some reason. For example, in FIG. 7G, the appearance of the term "Turquoise" in both 760b and 760c may indicate that turquoise products are popular, but the turquoise products in the store 209 are overpriced or inferior in some way to the turquoise products being offered by the competition. The merchant 210 may do some research by using the system through the customer interface 203 and inspecting the results of searches for "turquoise".

Figure 7H:
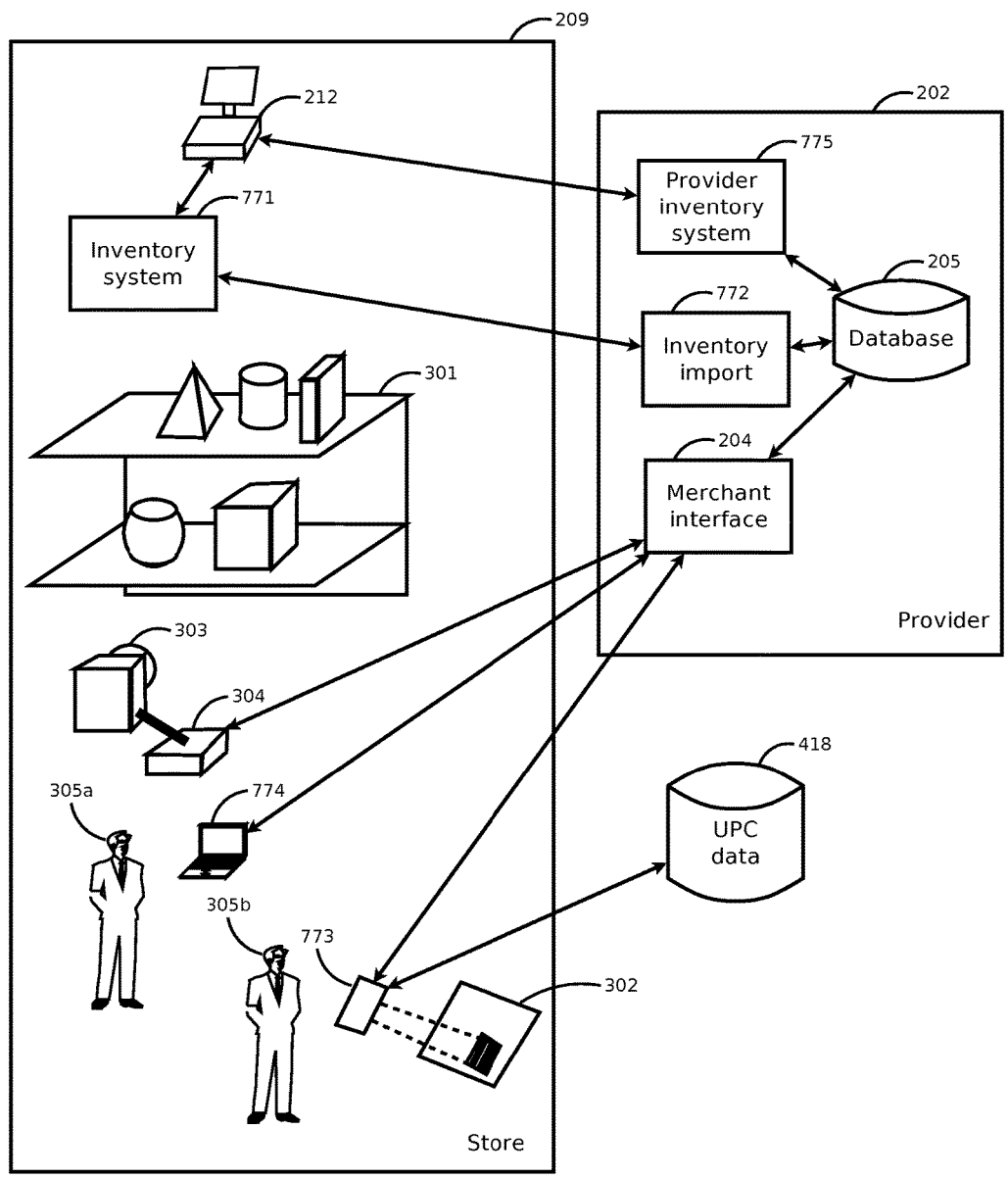
FIG. 7H is an illustrative block diagram of embodiments of systems for capturing inventory information.

FIG. 7H is an illustrative block diagram of embodiments of systems for capturing inventory information. The merchant may need to add product information to the database 205 for the products in the in-store inventory 301. For example, product information in the database 205 may be used by the product mapping module 402 that was previously described with respect to FIG. 4A. The merchant may already have product information in an inventory system 771 that may work in conjunction with the POS system 212. An inventory import module 772 may be able to move data from the inventory system 771 into the product information in the database 205, and may also be able to update the database 205 when the data in the inventory system 771 changes.

In one embodiment, the merchant may not have an inventory system 771 but may instead use a provider inventory system 775 provided by the provider 202. This may be running on a machine at the provider 202, or it may be running on a machine at the merchant 209. The provider inventory system 775 may not require a separate inventory import 772 in order to work with the database 205 at the provider 202.

A person 305a at the store 209 may enter product data manually using a device 774 through the merchant interface 204. This can be done as an isolated activity, or may be done in conjunction with the image capture process described in regards to FIG. 3A. When combined with the image capture process, the image information of the inventory 301 taken by the imaging device 303 and the control and storage equipment 304 can be included as part of the inventory information stored in the database 205.

A person 305b at the store 209 can use a device 773 to scan the bar code of the UPC 415 on products 302, and then use data from a UPC database 418 to send product information to the database 205 through the merchant interface 204. In one embodiment, the device 773 can be a consumer mobile device such as the iPhone by Apple Computer of Cupertino, Calif. In another embodiment, the device 773 can be a dedicated bar code scanner, such as the LS2208 Handheld Laser Scanner by Motorola Solutions of Schaumburg, Ill.

In an embodiment not illustrated in FIG. 7H, but similar in function to the use of the product bar code 415 with the UPC database, a person 305 at the store 209 can use a device to read a Radio Frequency IDentification (RFID) tag 422 on the product, and then use data from an RFID database 424 to send product information to the database 205 through the merchant interface 204. In one embodiment, the device can be a consumer mobile device such as the HTC One by HTC of Taipei, Taiwan. In another embodiment, the device can be a dedicated RFID reader, such as the MC3190-Z Handheld RFID Reader by Motorola Solutions of Schaumburg, Ill.

Figure 8:
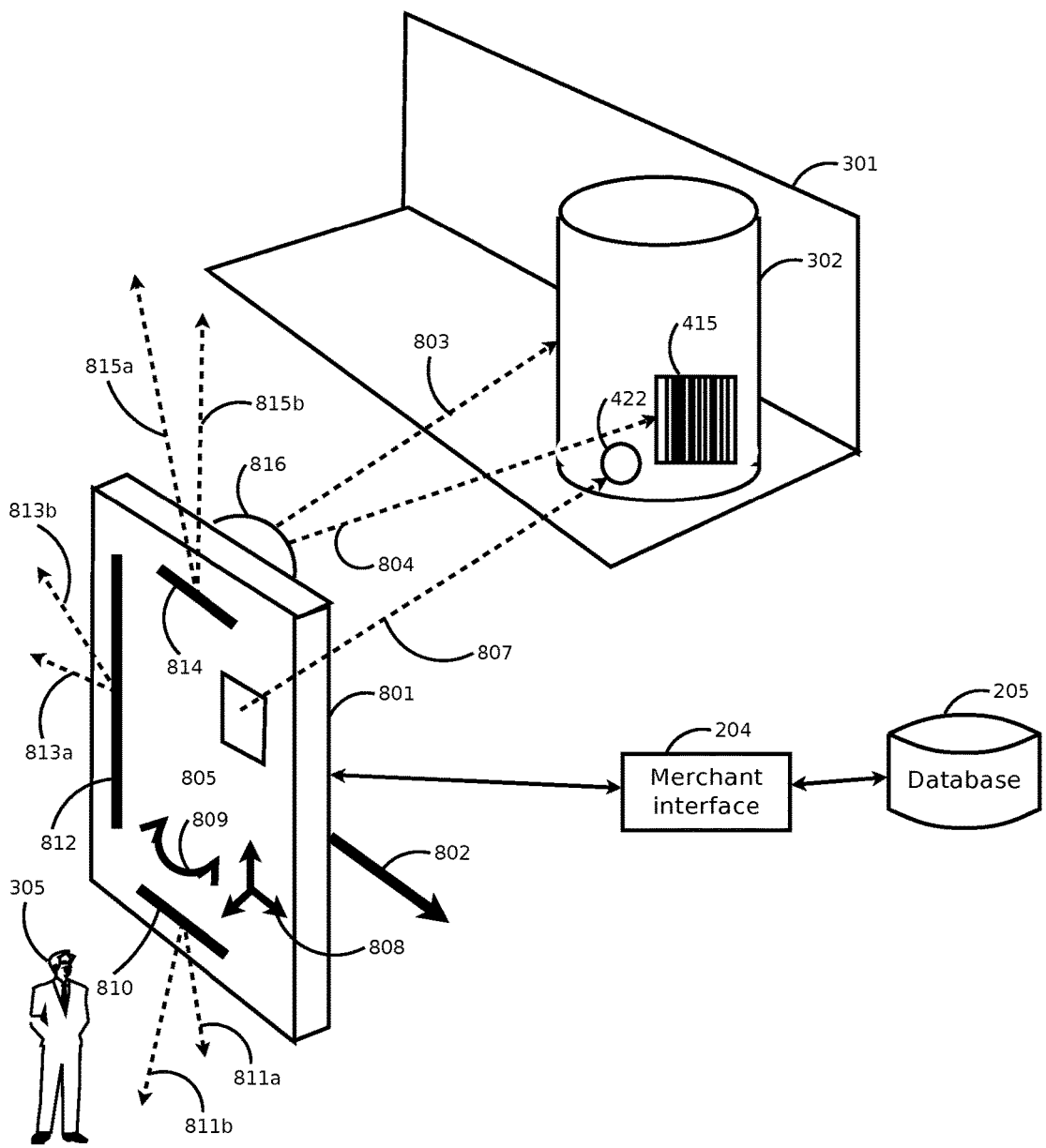
FIG. 8 is an illustrative block diagram of an embodiment of an integrated device for capturing images of in-store inventory, capturing product mapping information, and capturing inventory information.

FIG. 8 is an illustrative block diagram of an embodiment of an integrated device for capturing images of in-store inventory, capturing product mapping information, and capturing inventory information. A person 305 at the store 209 may be able to use a single device 801 to accomplish a number of the tasks described previously. In particular, the device 801 may be able to capture images of in-store inventory as previously described with regards to FIG. 3A, capture product mapping information as previously described with regards to FIG. 4B and FIG. 4C, and capture inventory information as previously described with regards to FIG. 7H. The person 305 may do these functions at the same time, or at different times. The device 801 may be a consumer mobile device such as the HTC One by HTC of Taipei, Taiwan.

The operating system of the device 801 may provide a location and orientation service so that application programs can find out the orientation and position of the device in three-dimensional space. The service may also provide the velocity or acceleration of the device as well. The location and orientation service can use several mechanisms built into the device in order to provide the best information available. The methods for measuring position and orientation are described here. The device 801 may have a Global Positioning System (GPS) antenna 814, which can receive signals 815 from one or more satellites in the GPS system. The differences in timing of the signals can allow the device 801 to determine its position and elevation on the Earth within about 10 meters or more, depending on how many signals 815 are available and their strength. The device 801 may have a WiFi antenna 810, which can send and receive signals 811 to and from local wireless data access points. The relative strengths of the signals 811, along with identification of the access points by their Media Access Control (MAC) address and a lookup of their position in a database using their MAC address, can allow the device to determine its position on the Earth within a few tens of meters or more, depending on how many signals 811 are available and whether they are in the database. The device 801 may have a cellular antenna 812, which can send and receive signals 813 to and from cell towers for voice and data communications. The relative strengths of the signals 813, along with identification of the cell towers and a lookup of their position in a database using their cell tower identification, can allow the device to determine its position on the Earth within a few tens of meters or more, depending on how many signals 813 are available. The device 801 may have a built-in accelerometer 808, which can provide the acceleration of the device in three axes, possibly using a Micro ElectroMechanical System (MEMS) circuit. Signals from the accelerometer 808 can be integrated to provide relative movement information of the device to within a few centimeters or even millimeters, depending on the accelerometer 808 and the nature of the movement of the device 801. The device 801 may have a built-in gyroscope 809, which can provide the orientation of the device in three axes, possibly using a MEMS circuit. These capabilities of the device 801 can be used separately or together to provide a fairly accurate tracking of the position and orientation of the device 801.

The device 801 may have a camera that can act as a video camera or a still-image camera. The device 801 may have a Near Field Communication (NFC) circuit 805 that can communicate with other NFC devices, or can read data from a passive Radio Frequency IDentification (RFID) tag 422. The device may have a network interface that can communicate with the merchant interface 204, possibly using the WiFi antenna 810 or the cellular antenna 812.

The person 305 can scan the device 801 past the in-store inventory 301, either manually or with some mechanical assistance, as indicated by 802. The device 801 can capture video imagery of a product 302 as indicated by 803. The device 801 can also use its location service to record the position and orientation of the device 801 during the video capture, to help with the process of stitching together the individual video frame images into a single image as previously described with respect to FIG. 3B. The device can transmit image data to the merchant interface 204, where it can be stored in the database 205 as captured images of in-store inventory.

The device 801 can detect the identification of the product by reading an RFID tag 422 on the product using the NFC reader 805, as indicated by 807. The device 801 can also detect and read a bar code 415 with UPC identification, using the camera 816 as indicated by 804. The device can use the position and orientation of the device 801 from the device location service, along with the product identification, to capture product mapping information and send it to the merchant interface 204, where it can be stored in the database 205.

The device can send the UPC or RFID product information to the merchant interface 204, where it can be stored in the database 205 as captured inventory information.

Figure 9:
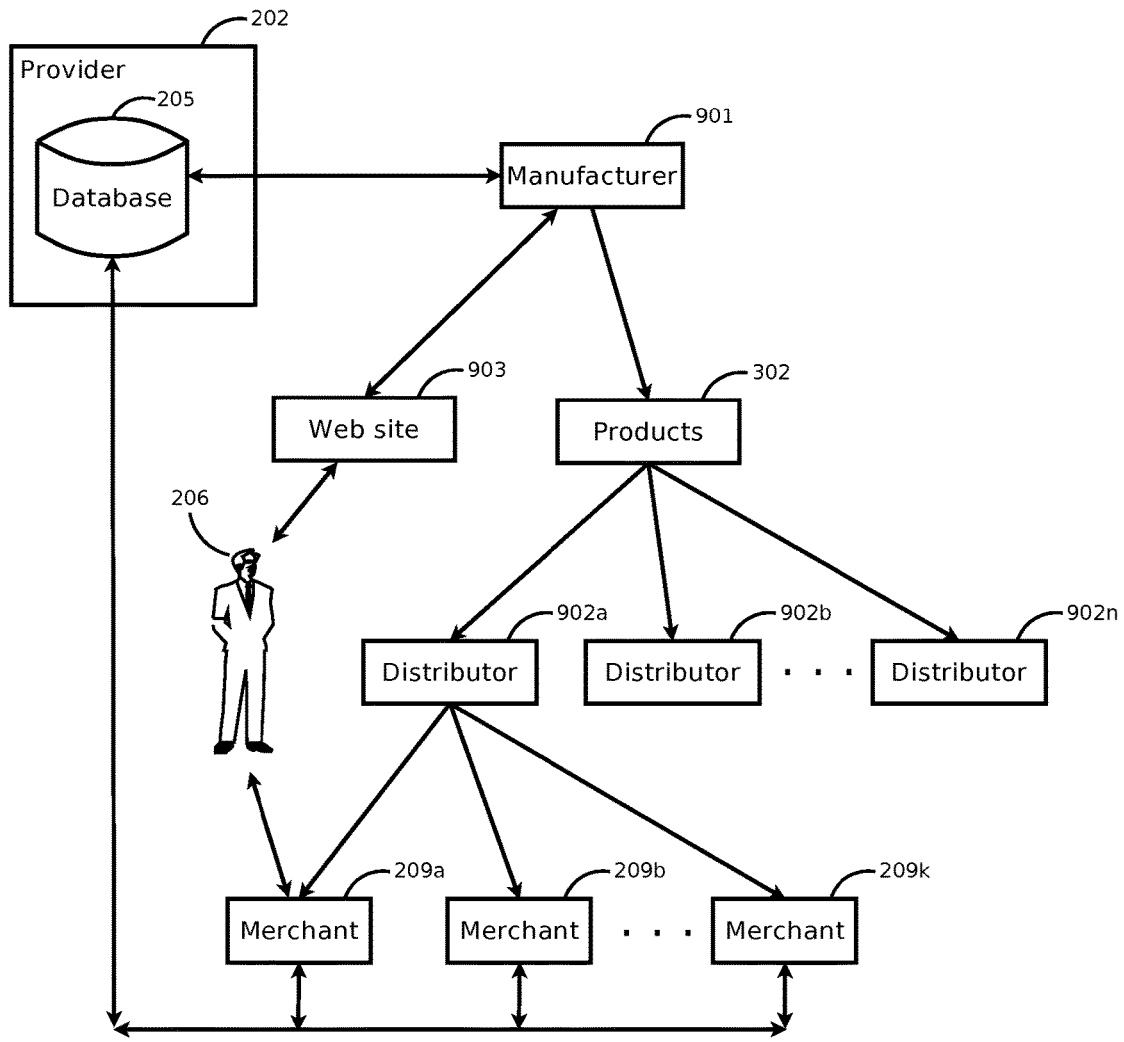
FIG. 9 is an illustrative block diagram of an embodiment of providing detailed inventory analytics to manufacturers.

FIG. 9 is an illustrative block diagram of an embodiment of providing detailed inventory analytics to manufacturers. A manufacturer 901 may provide products 302 to merchants 209 through distributors 902. For example, regional distributors 902 may handle local warehousing and shipping functions for manufacturers 901 who want a national presence but cannot afford to manage these functions everywhere. Even though the manufacturer 901 may know the quantity and type of products sent to the distributor 902, the manufacturer 901 may not know the quantity and type of products sent to each merchant 209, since this information may be kept by the distributors 902. In fact, the manufacturer 901 may not even know the identity of the merchants 209 carrying the products 302. Because of this, the manufacturer 901 may not be able to provide information on local availability for products 302 on their web site 903. Instead, they may only be able to provide contact information for the regional distributors 902. This may be confusing and unhelpful for customers 206, because their regional distributor 902a may not be set up well for contact with customers 206 and other retail functions.

The system illustrated in FIG. 7H can collect the information that the manufacturer 901 may be missing. As a result, the provider 202 may be able to aggregate information in the database 205 about products from a single manufacturer 901 and provide that information to the manufacturer 901. This can enable the manufacturer 901 to provide retail location and availability (in-stock versus on-order) information about products 302 on their web site 903. This may be very helpful to a customer 206 who knows a product 302 by brand name and finds the manufacturer's web site 903 with a search engine, but wants to know where to find the product at a local merchant 209a. Additionally, this may be very helpful to the manufacturer 901 by providing more detailed localized information about sales trends and demographics. Additionally, the manufacturer 901 may be able to derive even more useful marketing information by combining this information with activity from one or more online stores for the products 302. In one embodiment, the provider 202 can charge a fee to the manufacturer 901 for this service. In one embodiment, the provider 202 can provide a subsidy or payment to the merchant 209 in return for this use of inventory information in the database 205.

Figure 10:
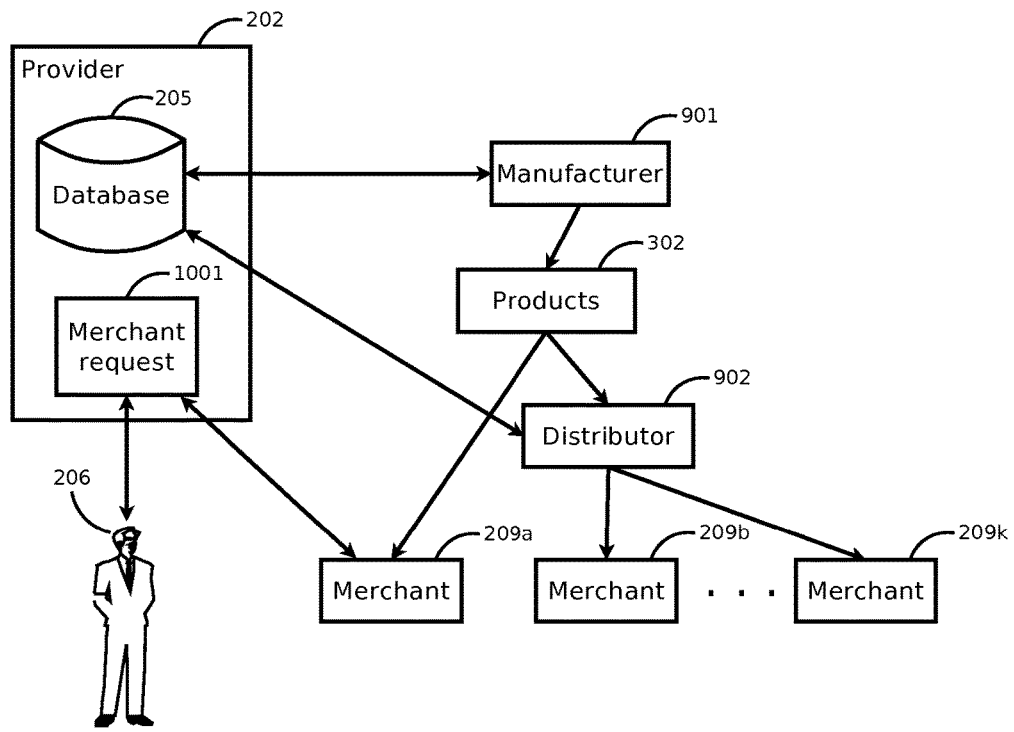
FIG. 10 is an illustrative block diagram of an embodiment of using information provided by manufacturers for inventory data.

FIG. 10 is an illustrative block diagram of an embodiment of using information provided by manufacturers for inventory data. The system illustrated in FIG. 7H may not be feasible for one or more merchants 209. For example, there may be no inventory system 771. In another example, the merchant 209 may not have the time or facilities to catalog and organize the inventory through the merchant interface 204. In these circumstances, it may still be desirable to collect inventory information in the database 205 for the merchant 209 to enable the search function illustrated in FIG. 5B to return results from the merchant 209.

For a manufacturer 901 who ships products directly to the merchant 209, relatively accurate inventory information may be available for those products 302 from the manufacturer 901, based on the timing and amounts of the shipments of products 302. If the manufacturer 901 provides some or all of the products 302 through distributors 902, then the same kind of inventory information may be available for those products 302 from the distributors 902. This limited inventory information may be very useful to a customer 206, because it can provide a search result 514 for a merchant 209 that is known to carry the product 302. In one embodiment, the system can have a merchant request interface 1001 to facilitate automating a request to the merchant 209 about the availability of the product 302, receiving a manual response from the merchant 209, and returning the response to the customer 206 using email, text message, and so on.

In one embodiment, the provider 202 may not have a business relationship with a merchant 209b, but may have a business relationship with a manufacturer 901 or distributor 902, and the provider 202 may still be able to provide useful search results to customers 206 about products 302 carried by that merchant 209b.

Figure 11:
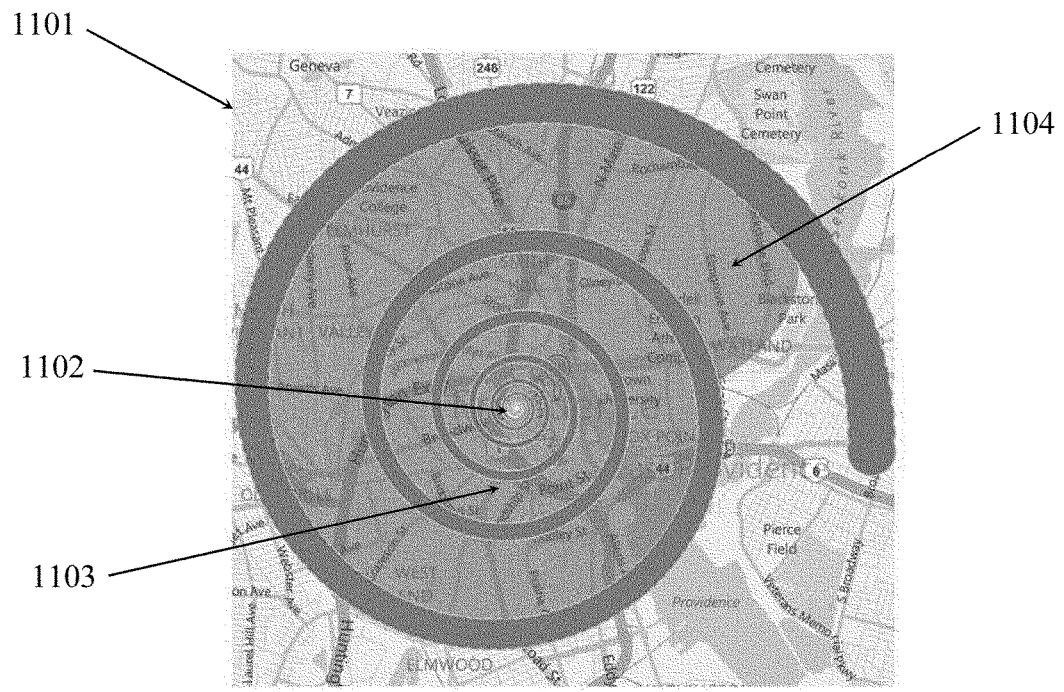
FIG. 11 is an illustrative map of an embodiment of a strategy for soliciting business relationships with merchants.

FIG. 11 is an illustrative map of an embodiment of a strategy for soliciting business relationships with merchants. The merchants 209 and customers 206 may receive the most benefit when the merchants 209 densely cover a connected geographic area, so that the customers 206 can find most or all of the instances of a product 302 in their area. The initial focus for signing up merchants 209 may therefore be in a metropolitan area 1101. The recruiting of merchants 209 may start in the center 1102 of the metropolitan area 1101, and then spread out in a spiral or concentric pattern 1103, eventually becoming large enough 1104 to cover most of the metropolitan area 1101. In one embodiment, the spiral pattern 1103 may be started at a location other than the center 1102 of the metropolitan area 1101. For example, it may be desirable to start the spiral pattern 1103 in a well liked shopping area. In another embodiment, more than one spiral pattern 1103 may be started concurrently. For example, it may be desirable to start several spiral patterns 1103 in the most popular shopping areas in the metropolitan area 1101.

Figure 12A:
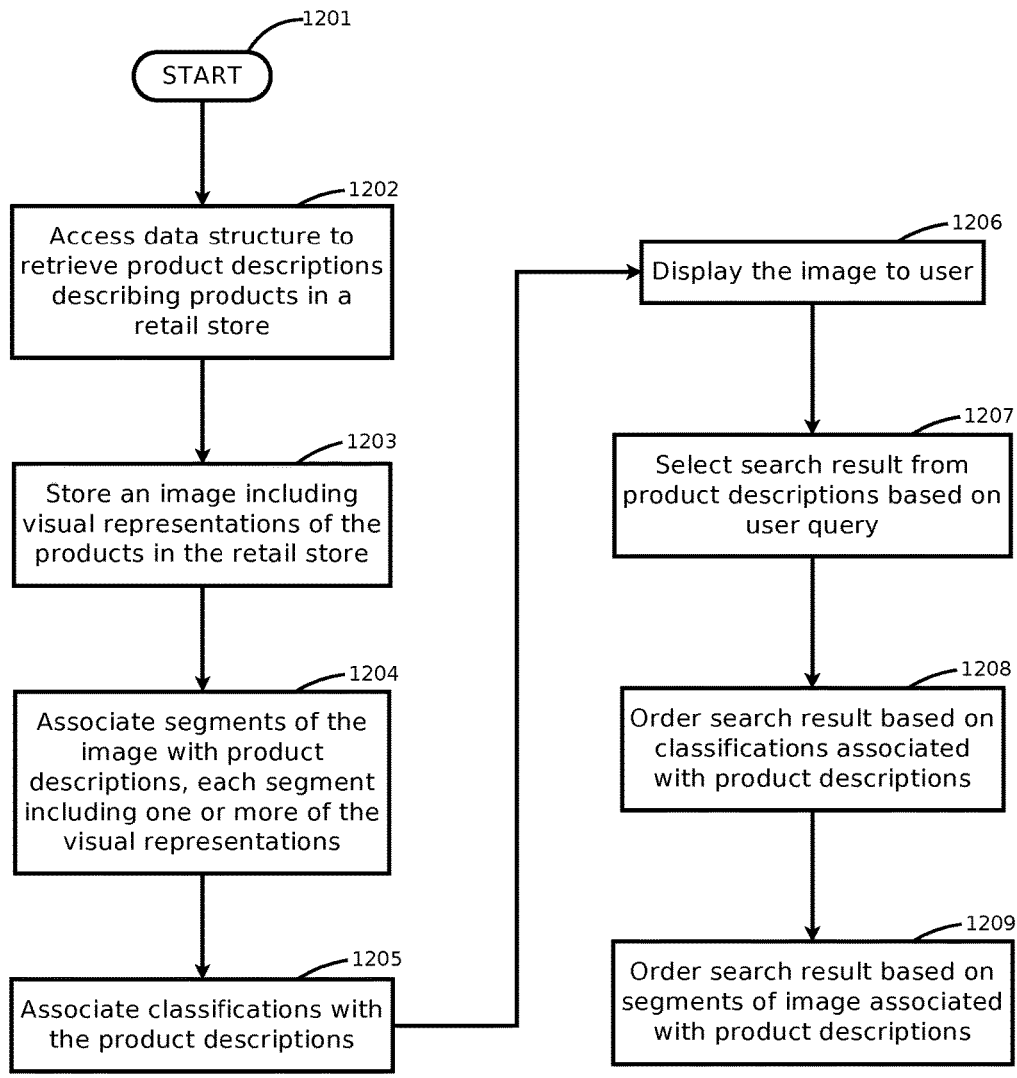
FIG. 12A is an illustrative flowchart depicting and example embodiment of a method for facilitating the retail shopping experience online, and for selecting a search result by a server.

FIG. 12A is an illustrative flowchart depicting and example embodiment of a method for facilitating the retail shopping experience online, and for selecting a search result by a server. The method 1201 can include accessing a data structure to retrieve product descriptions describing products in a retail store (1202). The method 1201 can include storing an image including visual representations of the products in the retail store (1203). The method 1201 can include associating segments of the image with product descriptions, each segment including one or more of the visual representations (1204). The method 1201 can include associating classifications with the product descriptions (1205). The method 1201 can include displaying the image to user (1206). The method 1201 can include selecting a search result from product descriptions based on a user query (1207). The method 1201 can include ordering the search result based on classifications associated with the product descriptions (1208). The method 1201 can include ordering the search result based on the segments of the image associated with the product descriptions (1209).

Figure 12B:
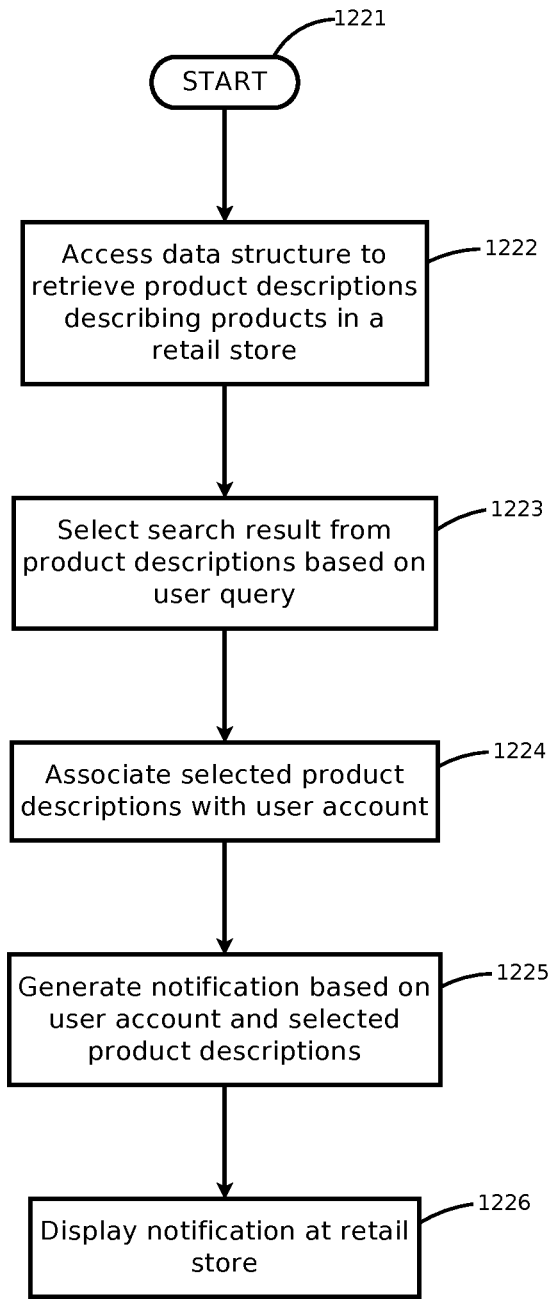
FIG. 12B is an illustrative flowchart depicting and example embodiment of a method for facilitating the retail shopping experience online, and for generating a notification by a server.

FIG. 12B is an illustrative flowchart depicting and example embodiment of a method for facilitating the retail shopping experience online, and for generating a notification by a server. The method 1221 can include accessing a data structure to retrieve product descriptions describing products in a retail store (1222). The method 1221 can include selecting a search result from the product descriptions based on a user query (1223). The method 1221 can include associating the selected product descriptions with a user account (1224). The method 1221 can include generating a notification based on the user account and the selected product descriptions (1225). The method 1221 can include displaying the notification at the retail store (1226).

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of selecting a plurality of search results by a server, comprising:

accessing, by the server, a first data structure storing, in a memory element, a first product description describing a first product located in a retail store and a second product description describing a second product located in the retail store;

receiving, by the server, a first captured image comprising a first visual representation of the first product and a second captured image comprising a second visual representation of the second product, the first product and the second product being visible from a single position within the retail store, the first captured image overlapping the second captured image;

storing, by the server via a second data structure, based on the first and second captured images, a stitched image comprising the first and second visual representations;

creating, by the server via the first and second data structures, a segment mapping between a first segment of the stitched image and the first product description, and between a second segment of the stitched image and the second product description, the first segment comprising the first visual representation and the second segment comprising the second visual representation;

associating, by the server via the first data structure, a first classification with the first product description and a second classification with the second product description;

displaying, by the server responsive to a first signal, the stitched image;

selecting, by the server via the first data structure, responsive to a second signal, the plurality of search results comprising a first search result corresponding to the first product description and a second search result corresponding to the second product description;

tracking, using a processor of the server, an x-axis offset and a y-axis offset of the first and second segments within the stitched image to determine a first segment location and a second segment location;

mapping, by the server via the segment mapping, the first segment location to the first product description and the first classification, and the second segment location to the second product description and the second classification;

automatically ordering, by the server via the first and second data structures responsive to a third signal, the plurality of search results based on the first classification, the second classification, the first segment location, and the second segment location; and transmitting, responsive to a fourth signal, the plurality of search results across a network.

2. The method of claim 1, further comprising:
transforming, by the server, the first captured image into a first transformed image and the second captured image into a second transformed image; and
stitching, by the server, the first and second transformed images into the stitched image.

3. The method of claim 1, further comprising:
receiving, by the server, a third captured image comprising a third visual representation of the first product;
comparing, by the server, the first captured image and the third captured image; and
identifying, by the server, based on the comparison, a change to the first product.

4. The method of claim 1, further comprising:
extracting, by the server from the first captured image, an identification of the first visual representation as the first product, the extraction selected from one of optical character recognition, bar code recognition, and image recognition.

5. The method of claim 1, further comprising:
accessing, by the server, a first inventory item in an inventory database; and
updating, by the server via the first data structure, the first product description from the first inventory item.

6. A system for selecting a plurality of search results, comprising:
a server including a processor and memory configured to:
access a first data structure storing, in a memory element, a first product description describing a first product located in a retail store and a second product description describing a second product located in the retail store;
receive a first captured image comprising a first visual representation of the first product and a second captured image comprising a second visual representation of the second product, the first product and the second product being visible from a single position within the retail store, the first captured image overlapping the second captured image;
store, via a second data structure, based on the first and second captured images, a stitched image comprising the first and second visual representations;
create, via the first and second data structures, a segment mapping between a first segment of the stitched image and the first product description, and between a second segment of the stitched image and the second product description, the first segment comprising the first visual representation and the second segment comprising the second visual representation;
associate, via the first data structure, a first classification with the first product description and a second classification with the second product description;
display, responsive to a first signal, the stitched image;
select, via the first data structure, responsive to a second signal, the plurality of search results comprising a first search result corresponding to the first product description and a second search result corresponding to the second product description;
track, using the processor of the server, an x-axis offset and a y-axis offset of the first and second segments within the stitched image to determine a first segment location and a second segment location;
map, via the segment mapping, the first segment location to the first product description and the first classification, and the second segment location to the second product description and the second classification;
automatically order, via the first and second data structures responsive to a third signal, the plurality of search results based on the first classification, the second classification, the first segment location, and the second segment location; and
transmit, responsive to a fourth signal, the plurality of search results across a network.

7. The system of claim 6, wherein the server is further configured to:
transform the first captured image into a first transformed image and the second captured image into a second transformed image; and
stitch the first and second transformed images into the stitched image.

8. The system of claim 6, wherein the server is further configured to:
receive a third captured image comprising a third visual representation of the first product;
compare the first captured image and the third captured image; and
identify, based on the comparison, a change to the first product.

9. The system of claim 6, wherein the server is further configured to:
extract, from the first captured image, an identification of the first visual representation as the first product, the extraction selected from one of optical character recognition, bar code recognition, and image recognition.

10. The system of claim 6, wherein the server is further configured to:
access a first inventory item in an inventory database; and
update, via the first data structure, the first product description from the first inventory item.

11. A method of selecting a plurality of search results by a server, comprising:
accessing, by the server, a first data structure storing, in a memory element, a first product description describing a first product located in a retail store and a second product description describing a second product located in the retail store;

receiving, by the server, a first captured image comprising a first visual representation of the first product and a second captured image comprising a second visual representation of the second product, the first product and the second product being visible from a single position within the retail store, the first captured image overlapping the second captured image;

storing, by the server via a second data structure, based on the first and second captured images, a stitched image comprising the first and second visual representations;

creating, by the server via the first and second data structures, a segment mapping between a first segment of the stitched image and the first product description, and between a second segment of the stitched image and the second product description, the first segment comprising the first visual representation and the second segment comprising the second visual representation;

displaying, by the server responsive to a first signal, the stitched image;

selecting, by the server via the first data structure, responsive to a second signal, the plurality of search results comprising a first search result corresponding to the first product description and a second search result corresponding to the second product description;

tracking, using a processor of the server, an amount of time that the first and second segments are displayed to determine a first segment time and a second segment time;

mapping, by the server via the segment mapping, the first segment to the first product description and the first search result, and the second segment to the second product description and the second search result;

automatically ordering, by the server via the first and second data structures responsive to a third signal, the first search result and the second search result within the plurality of search results based on the first segment time and the second segment time; and transmitting, responsive to a fourth signal, the plurality of search results across a network.

12. The method of claim 11, further comprising:
generating, by the server based on the first segment time and the second segment time, a heat map; and
displaying, by the server, the heat map.

13. A system for selecting a plurality of search results, comprising:

a server including a processor and memory configured to:
access a first data structure storing, in a memory element, a first product description describing a first product located in a retail store and a second product description describing a second product located in the retail store;

receive a first captured image comprising a first visual representation of the first product and a second captured image comprising a second visual representation of the second product, the first product and the second product being visible from a single position within the retail store, the first captured image overlapping the second captured image;

store, via a second data structure, based on the first and second captured images, a stitched image comprising the first and second visual representations;

create, via the first and second data structures, a segment mapping between a first segment of the stitched image and the first product description, and between a second segment of the stitched image and the second product description, the first segment comprising the first visual representation and the second segment comprising the second visual representation;

display, responsive to a first signal, the stitched image;

select, via the first data structure, responsive to a second signal, the plurality of search results comprising a first search result corresponding to the first product description and a second search result corresponding to the second product description;

track, using the processor of the server, an amount of time that the first and second segments are displayed to determine a first segment time and a second segment time;

automatically order, via the first and second data structures responsive to a third signal, the first search result and the second search result within the plurality of search results based on the first segment time and the second segment time; and transmit, responsive to a fourth signal, the plurality of search results across a network.

14. The system of claim 13, wherein the server is further configured to:
generate, based on the first segment time and the second segment time, a heat map; and
display the heat map.

* * * * *